SERIAL ARITHMETIC UNITS FOR BINARY-CODED DECIMAL COMPUTERS

Filed Nov. 26, 1952 4 Sheets-Sheet 1

INVENTOR.
ELDRED C. NELSON,

BY Lester L. Hecht

ATTORNEY.

Feb. 18, 1958 E. C. NELSON 2,823,855

SERIAL ARITHMETIC UNITS FOR BINARY-CODED DECIMAL COMPUTERS

Filed Nov. 26, 1952 4 Sheets-Sheet 2

INVENTOR.
ELDRED C. NELSON,
BY
Lester S. Hecht
ATTORNEY.

INVENTOR.
ELDRED C. NELSON,
BY Lester D. Hecht
ATTORNEY.

Feb. 18, 1958 E. C. NELSON 2,823,855

SERIAL ARITHMETIC UNITS FOR BINARY-CODED DECIMAL COMPUTERS

Filed Nov. 26, 1952 4 Sheets-Sheet 4

INVENTOR.
ELDRED C. NELSON,

BY Lester S. Hecht

ATTORNEY.

United States Patent Office 2,823,855
Patented Feb. 18, 1958

2,823,855

SERIAL ARITHMETIC UNITS FOR BINARY-CODED DECIMAL COMPUTERS

Eldred C. Nelson, Los Angeles, Calif., assignor, by mesne assignments, to Hughes Aircraft Company, a corporation of Delaware Application November 26, 1952, Serial No. 322,665

8 Claims. (Cl. 235—61)

Figure 1:
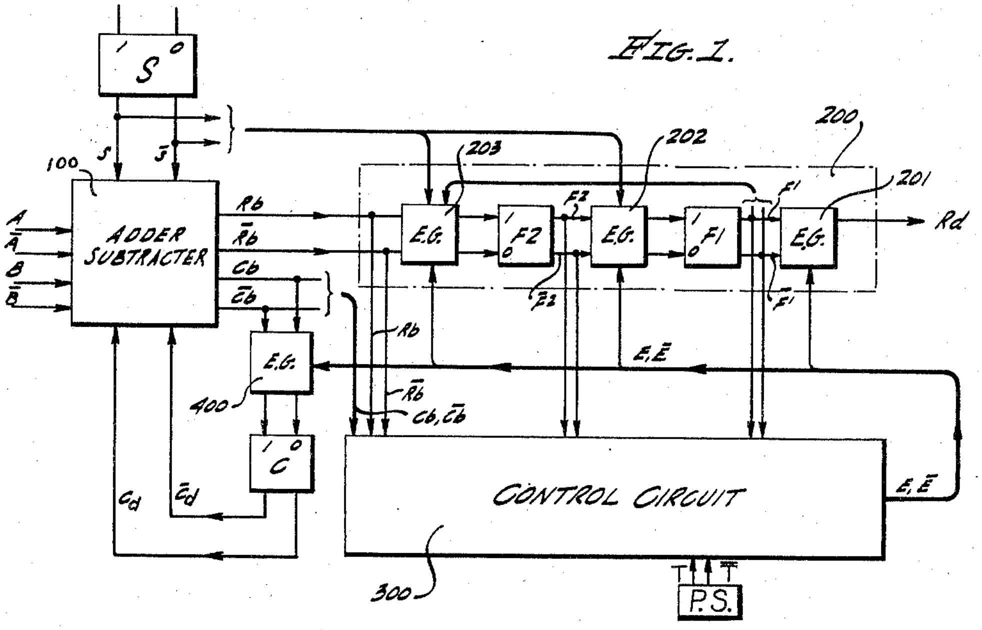

This invention relates to serial arithmetic units for binary-coded decimal computers, and more particularly to serial arithmetic units for performing mathematical operations upon binary-coded decimal digits by producing a first series of signals corresponding to the true binary result of the operation and then shifting and simultaneously correcting this series of signals to produce a second series of signals corresponding to the result in the desired binary-coded decimal form.

The general principles of the design of binary-coded decimal arithmetic units of the type wherein a true binary result, corresponding to the sum or difference of decimal digits, is produced and then corrected to provide the desired binary-coded decimal result, are described in copending application for patent entitled "Arithmetic Units for Decimal Coded Binary Computers" by Daniel L. Curtis, Serial No. 278,408, filed March 25, 1952, and assigned to the same assignee as the present application. In this application both serial and parallel arithemtic units are considered, each of the several embodiments disclosed including a correction control network which produces a control signal when the true binary result is not in the desired binary-coded decimal form. A correction transfer circuit, responsive to the control signal, is utilized to correct the true binary result to the desired binary-coded decimal form when the necessity for a correction is indicated by the control signal.

In the serial arithmetic system described in the copending application cited above, a first series of signals corresponding to the true binary result is shifted serially into a register and then is corrected. This may be considered as a static correction since no shift is performed while the correction is made. While this type of system provides satisfactory operation, it necessitates that an additional time interval be utilized for the correction and also that at least three flip-flops or bistable devices be included in the circuitry in order to store the digits of the true binary result which are to be corrected.

Where an additional time interval is required for the correction, the binary-coded decimal digit signals representing the numbers to be operated upon must be spaced so that the binary digit signals representing the next decimal digits are not entered into the arithmetic unit until the previous decimal result digit has been corrected. Thus, the binary-coded decimal equivalents of 358 and 549, in one binary-coded decimal form, would be recorded as 0011 0101 1000 and 0101 0100 1001, respectively.

The principal disadvantages, then, of the static correction system described in the copending application cited above are that an additional time interval is required for the correction, additional storage space must be utilized to store the input numbers, and at least three flip-flops are required in order to store the digits of the true binary result during correction.

The present invention provides a serial arithmetic unit of the type described in the copending application described above, but which requires no additional time interval for operation or space intervals for recording. Thus, the binary-coded decimal equivalent of 358 may be coded as 001101011000. In embodiments of the present invention, the true binary result is shifted and corrected without any additional delay, the desired binary-coded decimal result digits being produced and shifted in the same operation.

According to the present invention, a shifting and correcting register is provided which includes only two flip-flops and three electrical gating circuits. Two of the electrical gating circuits provide input and output circuits for the shifting register and one is utilized to interconnect the flip-flops. The electrical gating circuits are actuated by a control circuit similar to that described in the copending application which produces a control signal when a true binary result is not in the desired binary-coded decimal form.

The electrical gating circuits are actuated by the control circuit to shift each true binary result through the shifting and correcting register until the second and third binary digits of the true binary result, corresponding to the sum of two decimal digits, are stored therein. At this time, the electrical gates are actuated by the control circuit to produce signals representing the desired binary-coded decimal digit and to shift this result forward or out of the shifting and correcting register.

Since each desired binary-coded decimal result digit is produced and shifted in one operation, no additional delay is introduced as is required in the static correction system described above. Thus, the signal series corresponding to the desired binary-coded decimal result may be produced at a rate which is equal to the maximum shifting speed of the shifting and correcting register.

In addition to producing the desired binary-coded decimal result, a further correction is made in order to provide the required decimal carry correction between binary-coded decimal places. This correction is made simultaneously with the above-described correction.

Accordingly, it is an object of the present invention to provide a serial arithmetic unit wherein the true binary results of an operation are corrected to produce the desired binary-coded decimal result digits without any additional delay.

Another object of the present invention is to provide a serial binary-coded decimal arithmetic unit which requires only two flip-flops to store the digits of the true binary results during correction.

An additional object of the present invention is to provide a shifting and correcting register for a serial binary-coded decimal arithmetic system, said register including a minimum of bistable devices and producing binary-coded decimal results at a rate limited only by its maximum shifting speed.

A further object of the present invention is to provide an improved serial arithmetic unit for performing operations upon numbers in a binary-coded decimal form by producing a first series of signals corresponding to the true binary results of an operation and then correcting said first series of signals to produce a second series of signals corresponding to the result in said binary-coded decimal form.

Still another object of the present invention is to provide a serial binary-coded decimal adder requiring only two flip-flops for storing the true binary sums during correction and requiring only normal shifting time for producing the desired binary-coded decimal sum.

Yet another object of the present invention is to provide a serial binary-coded decimal subtracter requiring only two flip-flops and requiring no storage apparatus utilized for correction purposes and the additional time interval required for shifting information into and out of same leading to the desired binary-coded decimal difference.

The novel features which are believed to be characteristic of the invention, both as to its organization and method of operation, together with further objects and advantages thereof, will be better understood from the following description considered in connection with the accompanying drawings, in which several embodiments of the invention are illustrated by way of examples. It is to be expressly understood, however, that the drawings are for the purpose of illustration and description only, and are not intended as a definition of the limits of the invention.

Figure 2C:
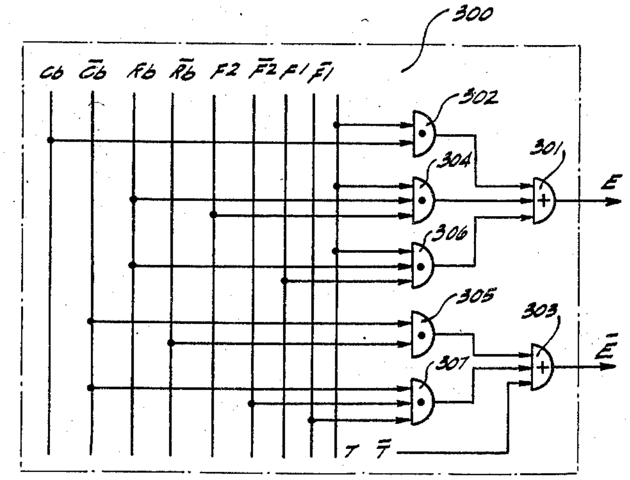
Figure 2A:
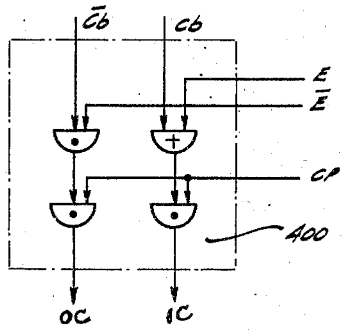
Figure 2B:
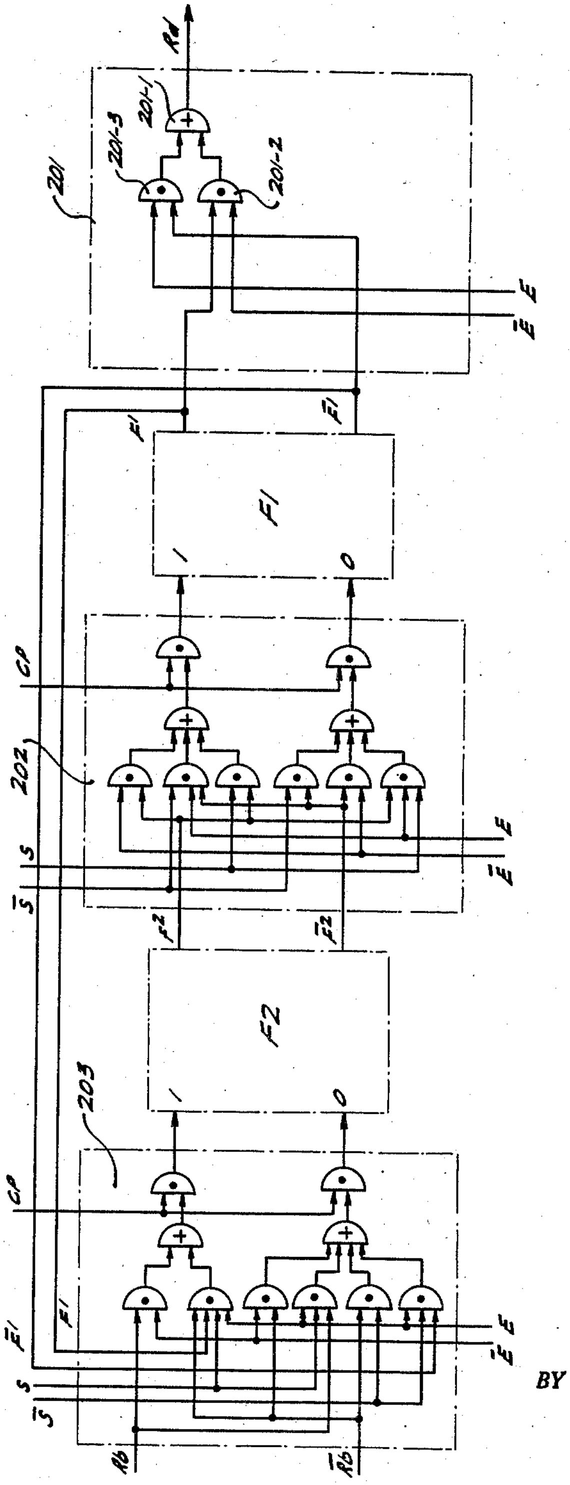
Figure 3A:
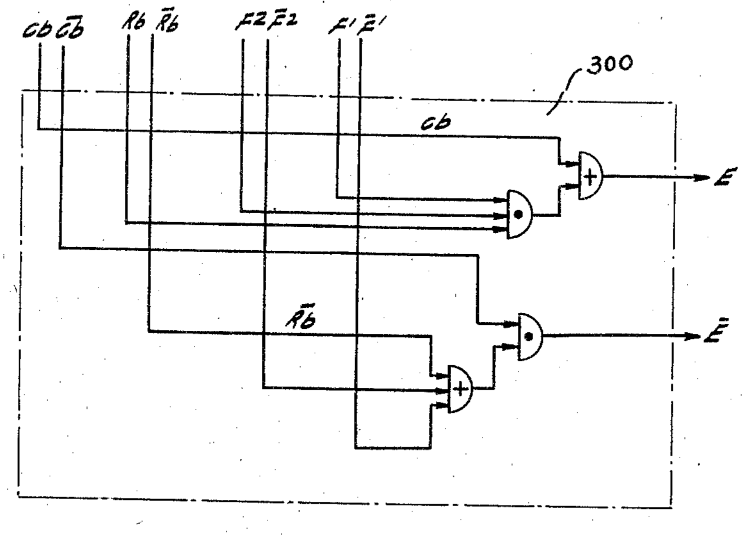
Figures 4, 5:
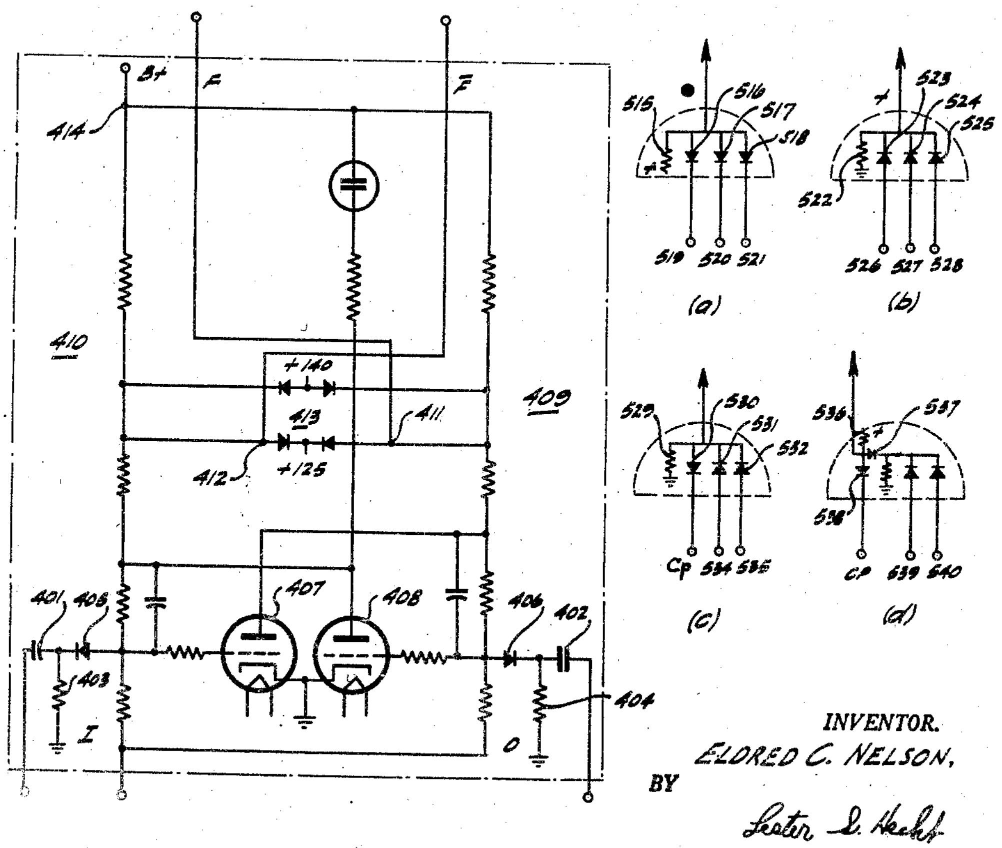
Figure 3B:
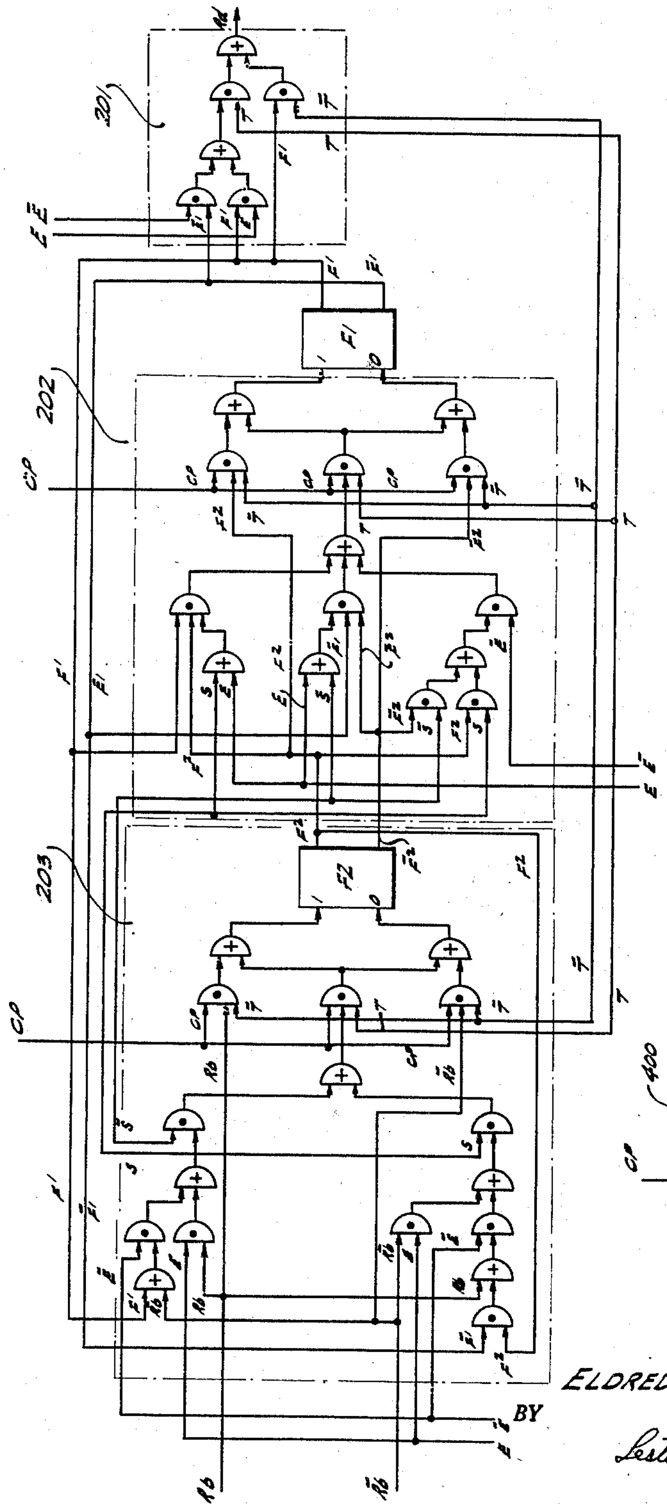
Figure 3C:
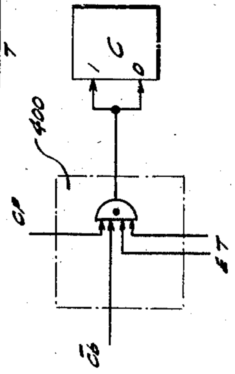

Fig. 1 is a block diagram of a serial binary-coded decimal arithmetic unit, according to this invention;

Fig. 2*a* is a schematic diagram of one form of the control circuit shown in Fig. 1;

Fig. 2*b* is a schematic diagram of one form of the shifting and correcting register shown in Fig. 1;

Fig. 2*c* is a schematic diagram of one form of the electrical gating circuit for carry correction shown in Fig. 1;

Fig. 3*a* is a schematic diagram of another form of the control circuit shown in Fig. 1;

Fig. 3*b* is a schematic diagram of another form of the shifting and correcting register shown in Fig. 1;

Fig. 3*c* is a schematic diagram of another form of the electrical gating circuit for carry correction shown in Fig. 2*c*;

Fig. 4 shows a flip-flop or bistable device suitable for use in embodiments of the present invention; and Figs. 5*a*, 5*b*, and 5*c* and 5*d*, show "and," "or," and clock pulse circuits, respectively, suitable for the arithemtic units of the present invention.

Referring now to Fig. 1, there is shown one embodiment of a serial arithmetic unit for performing mathematical operations upon first and second binary-coded decimal numbers A and B by first producing a first pair of complementary signal series R*b* and $\overline{Rb}$ corresponding to the true binary results of the operation and a second pair of complementary signal series C*b* and $\overline{Cb}$ corresponding to the true binary carries, and then producing a third signal series R*d* corresponding to the result of the operation in the desired binary-coded decimal form.

Each of the signal series includes four binary digit signals generally designated by a superscript corresponding to the digit position. Thus, the third binary digits in signal series R*b*, $\overline{Rb}$, and R*d*, are represented as $Rb^3$, $\overline{Rb}^3$, and $Rd^3$, respectively.

The arithmetic unit of Fig. 1 comprises an adder-subtracter unit 100 which is responsive to signals representing numbers A and B to produce the complementary signal series R*b*, $\overline{Rb}$ and C*b*, $\overline{Cb}$; a shifting and correcting register 200; a control circuit 300 for actuating register 200 to shift signal series R*b* into the register and for further actuating register 200 to produce signal series R*d* and to shift signal series R*d* out of the register; a flip-flop or bistable device C for producing signals corresponding to complementary carry signal series C*b* and $\overline{Cb}$; an electrical gating circuit 400 connected to the input circuit of flip-flop C for producing decimal carry signals C*d* during a correction time interval and for entering true binary carry signals C*b* at all other times; and operation sign storage flip-flop S for storing the sign of an operation and producing corresponding complementary signals S and $\overline{S}$, as will be made more evident hereinafter.

Shifting and correcting register 200 includes two flip-flops F1 and F2 and first, second, and third electrical gating circuits 201, 202, and 203. First electrical gating circuit 201 is connected to flip-flop F1 and provides an output circuit for register 200. Second electrical gating circuit 202 interconnects flip-flops F1 and F2, and third electrical gating circuit 203 is connected to flip-flop F2 and provides an input circuit for register 200.

Flip-flops F1 and F2 produce complementary output signals $F^1$, $\overline{F}^1$ and $F^2$, $\overline{F}^2$, respectively. Each flip-flop also includes a 1 and a 0 input circuit. A signal applied to the 1 input circuit of a flip-flop causes it to register a 1; a signal applied to the 0 input circuit causes it to register a 0; and the simultaneous application of signals to both input circuits "triggers" or causes a reversal of the flip-flop. The detailed operation of a typical flip-flop circuit will be described hereinafter in conjunction with the description of Fig. 4.

The flip-flop input circuits are designated by a 1 or a 0 followed by the flip-flop representation. Thus, the 1 input circuit of flip-flop F2 is represented as 1F2.

Hereinafter, the symbols utilized to represent the signals may also be utilized to represent a lead or cable in the drawings or a variable in the equations which follow. Thus, the symbol $F^1$ represents one of the signals produced by flip-flop F1, one of the leads connected to the output circuit of the flip-flop, and a variable $F^1$ in the algebraic functions which follow.

Control circuit 300 responds to complementary timing signals T and $\overline{T}$, produced by an external source, having signal levels representing binary 1 and 0, respectively, when signals $Rb^2$ and $Rb^3$ are stored in flip-flops F1 and F2, respectively. At this time, that is, during the fourth digit interval adder-subtracter unit 100 produces signals $Rb^4$, $\overline{Rb}^4$, $Cb^4$, and $\overline{Cb}^4$. Signals T and $\overline{T}$ have have levels representing binary 0 and 1, respectively, at all other times. The complementary timing signals T and $\overline{T}$ are generated by a controlled pulse generator cooperating with the control circuit 300 and having its output leads T and $\overline{T}$ connected into the control circuit 300 as shown in Fig. 2*a*.

Control circuit 300 responds to signals $Rb^4$, $\overline{Rb}^4$, $Cb^4$, $\overline{Cb}^4$, $F^1$, $\overline{F}^1$, and $F^2$, $\overline{F}^2$, applied via corresponding leads, to produce complementary control signals E and $\overline{E}$. Signals E and $\overline{E}$ are at levels representing binary 1 and 0, respectively, when the sum of corresponding decimal digits of numbers A and B plus any decimal carry C*d* is greater than 9 or the difference is less than 0, and at levels representing binary 0 and 1, respectively, when the sum is equal to or less than 9 or the difference is equal to or greater than 0.

It will be noted that hereinafter the words sum and difference are assumed to relate to the result of an operation upon two digits only. Thus, in adding numbers 358 and 549, there are two sums formed which are greater than 9 and one which is equal to 9. When 8 and 9 are added, a sum of 17 is formed, when 4 and 5 and the carry from the preceding operation are added a sum of 10 is formed, and when 3 and 5 and the carry are added a sum of 9 is formed.

The control circuit and the electrical gating circuits include "and" and "or" circuits which are mechanized or connected in accordance with Boolean algebraic equations. Illustrative types of "and" and "or" gating circuits suitable for use in embodiments of the present invention are shown on pages 37 to 45 of "High-Speed Computing Devices" by Engineering Research Associates, published in 1950 by McGraw-Hill Book Company, Inc., New York and London, and in an article entitled "Diode coincidence and mixing circuits in digital computers" by Tung Chang Chen, in volume 38 of Proceedings of the Institute of Radio Engineers, on pages 511 through 514. In addition, specific diode "and" and "or" circuits as well as clock pulse circuits are considered in detail in this specification.

The Boolean algebraic equations for the mechanization of the "and" and "or" circuits are determined by the correction which must be made to transform the true binary results into the desired binary-coded decimal result digits. The control circuit is mechanized to produce a signal which indicates the correction which is to be made, and the electrical gating circuits are mechanized to produce signals corresponding to the desired binary-coded decimal result signal series R*d* and the desired decimal carry signals C*d*.

Since each mechanization depends upon the particular code which is selected, codes which are suitable are considered first. After these codes have been discussed, the mechanization for one is considered in detail. In this discussion, the algebraic functions for the mechanization of the control circuit are derived first and then those defining the structure of the electrical gating circuits are considered. One of the mechanizations suitable for the first code considered is illustrated in Figs. 2*a*, 2*b*, and 2*c*.

After considering a specific mechanization suitable for one code, the general technique of mechanization is considered with regard to other codes. For simplicity, only one of these mechanizations is illustrated in Figs. 3*a*, 3*b*, and 3*c*.

Finally after the mechanization theory has been studied, specific circuit elements suitable for use in embodiments of the present invention are considered, reference being made to Figs. 4, 5*a*, 5*b*, 5*c*, and 5*d*.

Only seven of the 16!/6! possible binary codes for representing decimal numbers are commonly used with a conventional serial adder-subtracter unit which produces true binary results. When numbers A and B are in one of these seven codes, a binary digit of number A may be added to the corresponding binary digit of number B and any carry produced is then added to the next place binary digits of A and B without introducing any error. In all of the other codes, addition or subtraction requires special carries and cannot be performed with the conventional serial binary adder-subtracter unit.

Serial adder-subtracter units of the type described above are shown in U. S. patent Serial No. 2,609,143 entitled "Electronic Computer for Addition and Subtraction" by G. R. Stibitz, issued September 2, 1952, and in copending application for patent entitled "Arithmetic Units for Digital Computers" by Eldred C. Nelson, Serial No. 189,318, filed October 10, 1950, now abandoned, and refiled as a continuation Serial No. 607,494, on August 31, 1956, and now Patent No. 2,803,401, issued August 20, 1957.

Each of the seven codes, suitable for use in embodiments of the present invention is herein referred to as an "excess-N" code, wherein N may be considered to be a binary-coded decimal digit representing 0. Each decimal digit of the binary-coded decimal numbers in an "excess-N" code is expressed as the binary equivalent of the digit plus N. Thus, the decimal digits of A and B are expressed as the binary equivalents of $(a+N)$ and $(b+N)$, respectively. As an example of the "excess-N" codes, consider the binary-coded equivalents of the decimal digits 0 through 5 in the excess 0, 3, and 6 codes. In the excess-0 code these numbers appear as 0000, 0001, 0010, 0011, 0100, and 0101, respectively; in the excess-3 code as 0011, 0100, 0101, 0110, 0111, and 1000, respectively; and in the excess-6 code as 0110, 0111, 1000, 1001, 1010, and 1011, respectively.

When the sum of the corresponding decimal digits of numbers A and B is equal to or less than 9, the true binary sum $(a+b+2N)$ is corrected to the desired binary-coded decimal digit $(a+b+N)$ by subtracting the binary equivalent of N. When the sum of corresponding digits of numbers A and B is greater than 9, the true binary sum is corrected by adding the binary equivalent of $(6-N)$ to produce the desired binary-coded decimal digit. Where the sum of the decimal digits is greater than 9, the desired binary-coded decimal carry is 1 regardless of the value of the true binary carry.

As an illustration of the correction required in addition, consider the following problem in the "excess-0" code:

| | | | |
|---|---|---|---|
| $A=358=$ | 0011 | 0101 | 1000 |
| $B=549=$ | 0101 | 0100 | 1001 |
| Decimal carries $(Cd)$ | 1 | 1 | |
| True binary sums $(Rb)$ | 01001 | 01010 | 10001 |
| Correction (+6) | 0000 | 0110 | 0110 |
| Binary coded decimal result=907= | 1001 | 0000 | 0111 |

In this problem it will be noted that the sum of the least significant decimal digits of A and B is a number greater than 9 (8+9=17) and consequently a correction is made by adding the binary equivalent of 6. This correction converts the true binary result representing 17 to the desired binary-coded decimal result of 7 with a decimal carry of 1.

When the higher place binary-coded decimal digits are added, the carry from the preceding place is included and added to the least significant binary digits. Since the result of the next addition is also greater than 9 (10=5+4+1), 6 is again added. The operation in this case differs somewhat from the first since, prior to the correction, the true binary result includes a carry of 0. Thus, in this case the carry must be changed to 1 for the next addition. It will be noted, moreover, that without the decimal carry from the preceding place no correction would be required.

The final sum is not greater than 9 (3+5+1=9) and consequently no correction is required or zero is added.

When the decimal digit $(b+N)$ is substracted from decimal digit $(a+N)$ and the difference $(a-b)$ is equal to or greater than 0, the corrections are made by adding the binary equivalent of N to produce the desired binary-coded decimal result $(a-b+N)$. When the difference of $(a+N)$ and $(b+N)$ is less than 0 or is a negative number, the correction is made by subtracting $(6-N)$. The binary-coded decimal result produced in this case in the 10's complement of the difference. As an illustration of the correction required in subtraction, consider the following subtraction problem in the "excess-0" code:

| | | | |
|---|---|---|---|
| $A=358=$ | 0011 | 0101 | 1000 |
| $B=529=$ | 0101 | 0010 | 1001 |
| Decimal carries $(Cd)$ | 1 0 | 1 | |
| True binary differences $(Rb)$ | 11110 | 00010 | 11111 |
| Correction (−6) | 0110 | 0000 | 0110 |
| Binary coded decimal result=829= | 1000 | 0010 | 1001 |

The true binary difference produced by the subtraction of the first decimal digit of B from A is less than 0 (−1) and thus the correction is made by subtracting 6. This produces the binary equivalent of the desired 10's complement digit (9). The carry produced by this operation is included in the next subtraction, where the true binary difference produced is greater than 0 (2). In this case, no correction is required or 0 is subtracted. When the third decimal digits are subtracted the true binary sum is less than 0 and 6 is again subtracted to produce the desired binary-coded decimal digit in the difference. At this time a carry is also produced which may be utilized to indicate the sign of the result.

As has been explained, control signal E produced by control circuit 300 has a level representing binary 1 when the sum of corresponding decimal digits of numbers A and B is greater than 9 or when the difference between these digits is less than 0; and has a level representing binary 0 when the sum is equal to or less than 9 or the difference is equal to or greater than 0. For the excess-0 code, this means that the binary variable E has a value of 1 if there is a carry produced during the addition of the fourth place binary digits or if the true binary sum includes a 1 in the fourth place and in either the third or the second place. This relationship may be expressed by the Boolean algebraic function:

$$E=Cb^4+Rb^4.(Rb^3+Rb^2)$$

where the logical "or" is expressed as a plus sign (+) and the logical "and" is expressed as a dot (.). This function then is interpreted as follows. If $Cb^4=1$ or if $Rb^4$ and either $Rb^3$ *or* $RB^2=1$, $E=1$.

That the above function is 1 whenever the sum is greater than 9 may be checked by considering several of the possible sums. Whenever $Cb^4$ is 1, the true binary sum must be 16 or greater. If $Cb^4$ is equal to 0 and $Rb^4=Rb^3=1$, the sum must be 12 or greater and if $Rb^4=Rb^2=1$, the sum must be 10 or greater.

The algebraic function for $\overline{E}$, the complement of E, may be derived from the function for E by complementing that function according to well-known Boolean algebraic rules. This provides the function:

$$\overline{E}=\overline{Cb}^4.(\overline{Rb}^4+\overline{Rb}^3.\overline{Rb}^2)$$

In subtraction a carry is produced whenever the result is negative or less than 0. Thus, E is equal to 1 for subtraction whenever there is a carry, $Cb^4$. However, the control signal for addition may also be utilized for subtraction since negative numbers also appear to be greater than 9.

The correction for the excess-0 sum may be performed by adding binary signals E representing the binary equivalent of 6. This may be expressed as follows:

$$\begin{array}{ccccc} Cb^4 & Rb^4 & Rb^3 & Rb^2 & Rb^1 \\ & 0 & E & E & 0 \\ \hline Cd & Rd^4 & Rd^3 & Rd^2 & Rd^1 \end{array}$$

where $Cb^4$ may be considered as the fifth digit of the true binary sum.

In the addition of signals E representing 6, it will be noted that no change is required in the least significant binary place since 0 is added to $Rb^1$ to give $Rd^1$. Thus, $Rd^1=Rb^1$.

$Rd^2$ is the sum of $Rb^2$ and E, and is equal to 1 when E is equal to 1 and $Rb^2$ is equal to 0, as indicated by $\overline{Rb}^2=1$, or is equal to 1 if E is equal to 0, as indicated by $\overline{E}=1$, and $Rb^2$ is equal to 1. This may be expressed algebraically as:

$$Rd^2=E.\overline{Rb}^2+\overline{E}.Rb^2$$

$Rd^3$ is the sum of $Rb^3$ and E and any carry produced by the addition of $Rb^2$ and E. When $E=1$ and $Rb^2=Rb^3=0$, as signalled by $\overline{Rb}^2=\overline{Rb}^3=1$, no carry is produced and $E=1$ is added to $Rb^3=0$ producing a sum digit of 1. When $E=1$ and $Rb^2=Rb^3=1$, a carry is produced by the addition of $Rb^2$ and E and when added to the next E signal and $Rb^3$ a sum of 1 results. $Rd^3$ is also equal to 1 if $E=0$ and $Rb^3=1$, regardless of the value of $Rb^2$, since, in this case, there can be no carry from the preceding addition and the sum of $Rb^3$ and E is equal to 1. The logical expression for this analysis is found in the function:

$$Rd^3=E.(\overline{Rb}^2.\overline{Rb}^3+Rb^2.Rb^3)+\overline{E}.Rb^3$$

$Rd^4$ is the sum of $Rb^4$ and any carry, the sum being 1 when there is no carry and $Rb^4$ is equal to 1 or when there is a carry and $Rb^4$ is equal to 0. If E and either $Rb^3$ or $Rb^2$ is equal to 1, there is a carry into the fourth place and the sum digit $Rd^4$ is 1 if $Rb^4$ is equal to 0. No carry is produced if E is equal to 1 and $Rb^3=Rb^2=0$ or if E is equal to 0. In both of these cases, the sum digit $Rd^4$ is equal to 1 if $Rb^4$ is equal to 1. These relationships can be expressed by the Boolean algebraic function:

$$Rd^4=E.[Rb^4.\overline{Rb}^3.\overline{Rb}^2+E.\overline{Rb}^4.(Rb^3+Rb^2)]+\overline{E}.Rb^4$$

This function may be expanded according to well-known Boolean algebraic rules and expressed as:

$$Rd^4=E.Rb^4.\overline{Rb}^3.Rb^2+E.\overline{Rb}^4.Rb^3+E.\overline{Rb}^4.Rb^2+\overline{E}.Rb^4$$

The expanded function may be simplified by noting that the "and" functions $E.Rb^4.\overline{Rb}^3.\overline{Rb}^2$ and $E.\overline{Rb}^4.Rb^3$ are never satisfied i. e., they are always equal to 0. In order for these functions to be equal to 1, E must be equal to 1 indicating that the true binary sum produced represents a number greater than 9. However, the function $E.Rb^4.\overline{Rb}^3.\overline{Rb}^2$ must then represent a sum greater than 24, and the function $E.\overline{Rb}^4.Rb^3$ must represent a sum greater than 20, both of which are greater than the maximum sum which may be produced in adding two digits and any preceding decimal carry. Thus, these functions cannot exist. Substituting 0 for these functions, then, the expanded function above may be simplified to:

$$Rd^4=E.\overline{Rb}^4.Rb^2+\overline{E}.Rb^4$$

Since the binary-coded decimal carry is 1 whenever E is equal to 1, and 0 whenever E is equal to 0, the expression for $Cd$ is simply: $Cd=E$.

The functions for the digits of the binary-coded decimal result may also be derived from "truth" tables shown below, wherein the true binary result digits and the desired binary-coded decimal result digits are tabulated for each of the possible results. In Table I the true binary sum digits and desired binary-coded decimal sum digits are tabulated, only those codes corresponding to sums of 0 through 19 being included since no other sums are possible. The least significant binary digits are not tabulated since no correction is required.

It will be noted that at the bottom of Table I, there is an additional symbol for each column. These symbols correspond to actual signals appearing in the circuit shown in Fig. 1 and are explained in detail after the symbols at the top of Table I are considered.

TABLE I

| Sum | $\overline{E}$ | E | $Cb^4$ | $Rb^4$ | $Rb^3$ | $Rb^3$ | $Cd$ | $Rd^4$ | $Rd^3$ | $Rd^2$ |
|---|---|---|---|---|---|---|---|---|---|---|
| (0, 1) | 1 | 0 | 0 | 0 | 0 | 0 | 0 | 0 | 0 | 0 |
| (2, 3) | 1 | 0 | 0 | 0 | 0 | 1 | 0 | 0 | 0 | 1 |
| (4, 5) | 1 | 0 | 0 | 0 | 1 | 0 | 0 | 0 | 1 | 0 |
| (6, 7) | 1 | 0 | 0 | 0 | 1 | 1 | 0 | 0 | 1 | 1 |
| (8, 9) | 1 | 0 | 0 | 1 | 0 | 0 | 0 | 1 | 0 | 0 |
| (10, 11) | 0 | 1 | 0 | 1 | 0 | 1 | 1 | 0 | 0 | 0 |
| (12, 13) | 0 | 1 | 0 | 1 | 1 | 0 | 1 | 0 | 0 | 1 |
| (14, 15) | 0 | 1 | 0 | 1 | 1 | 1 | 1 | 0 | 1 | 0 |
| (16, 17) | 0 | 1 | 1 | 0 | 0 | 0 | 1 | 0 | 1 | 1 |
| (18, 19) | 0 | 1 | 1 | 0 | 0 | 1 | 1 | 1 | 0 | 0 |
| | ---- | ---- | Cb | Rb | $F^2$ | $F^1$ | C | F2 | F1 | Rd |

From this table the "truth" of the functions derived above can be established. For example, it is noted in analyzing the table that $Rd^2$, the second digit of the desired binary-coded decimal sum, is 1 only when $\overline{E}=Rb^2=1$ or when $E=\overline{Rb}^2=1$; and that $Rd^3$ is 1 only when $\overline{E}=Rb^3=1$, or when $E=1$ and either $Rb^3=Rb^2=1$ or $\overline{Rb}^3=\overline{Rb}^2=1$. These relationships define the same functions as those explained above, namely:

$$Rd^2=\overline{E}.Rb^2+E.\overline{Rb}^2$$

$$Rd^3=\overline{E}.Rb^3+E.(Rb^3.Rb^2+\overline{Rb}^3.\overline{Rb}^2)$$

It will also be noted in examination of the "truth" table that other functions may be utilized to define the relationship between the binary-coded decimal digits and the true binary digits. In the function for $Rd^3$, for example, $E.\overline{Rb}^3.\overline{Rb}^2$ may be replaced with $Cb^4.\overline{Rb}^2$, and in the function for $Rd^4$, $E.\overline{Rb}^4.Rb^2$ may be replaced with $Cb^4.Rb^2$.

The test of the validity of a function derived from the "truth" table is that it has a value equal to 1 only when the function is satisfied and is 0 at all other times. This means that whenever the complement of the function is equal to 1, there is a 0 in the "truth" table. Consider, for example, the complement of $Rd^3$:

$$\overline{Rd}^3=(E+\overline{Rb}^3).[\overline{E}+(Rb^2+Rb^3).(\overline{Rb}^2+\overline{Rb}^3)]$$

$$\overline{Rd}^3=E.\overline{Rb}^2.Rb^3+\overline{E}.\overline{Rb}^3+Rb^2.\overline{Rb}^3$$

The "truth" of this function may be checked in the same manner as the other functions by referring to the table above. It will be noted that $Rd$ is 0 whenever $E=\overline{Rb}^2=Rb^3=1$ or $\overline{E}=\overline{Rb}^3=1$ or $Rb^2=\overline{Rb}^3=1$.

Having considered the relationship between the binary digits of the desired binary-coded decimal sum and the binary digits of the true binary sum, it is now necessary to consider these functions in terms of actual signals appearing in the circuit shown in Fig. 1. It has been pointed out that the control circuit is responsive to complementary timing signals T and $\overline{T}$ which have values of 1 and 0, respectively, when the second and third digits of the true binary result are stored in flip-flops F1 and F2, respectively. This means that signals $F^1$ and $F^2$ represent the second and third digits of the true binary result when $T=1$. Consequently, when $T=1$, $Rb^2$, $\overline{Rb}^2$ and $Rb^3$, $\overline{Rb}^3$ can be replaced with their equivalent signals $F^1$, $\overline{F}^1$ and $F^2$, $\overline{F}^2$, respectively in the above functions. Similarly, $Rb^4$ and $Cb^4$ can be replaced with signals $Rb$ and $Cb$ produced by the adder-subtracter unit 100. These substitutions are indicated at the bottom of Table I above.

In addition to substituting the actual signals for the variables in the above functions, the functions for E and $\overline{E}$ must be modified so that the correction is made only when T is equal to 1. At all other times, as indicated by $\overline{T}=1$, the operation is simply a shifting operation. Since in the excess-0 code shifting is performed when $\overline{E}=1$, shifting is performed whenever $\overline{E}$ or $\overline{T}=1$. The modified functions for E and $\overline{E}$ including complementary time functions T and $\overline{T}$, then appear as:

$$E=T.[Cb+Rb.(F^2+F^1)]$$
$$\overline{E}=\overline{Cb}.(\overline{Rb}+\overline{F}^2.\overline{F}^1)+\overline{T}$$

where it will be noted that $T.Cb$, $T.Rb$, $T.F^2$, and $T.F^1$ may be considered as the equivalents of $Cb^4$, $Rb^4$, $Rb^3$, and $Rb^2$, respectively.

When $T=1$ the digits of the true binary sum are to be corrected and shifted forward through shifting and correcting register 200. This means that signals $Rb$, $\overline{Rb}$ and $F^2$, $\overline{F^2}$ are to be corrected and shifted into flip-flops F2 and F1, respectively. At the same time, signal $F^1$ is to be corected to produce signal $Rd^2$ which appears at the output circuit of register 200. In other words, binary-coded decimal digits $Rd^3$ and $Rd^4$, when produced, are to be entered into flip-flops F1 and F2 and binary-coded decimal digit $Rd^2$ is to appear at the output circuit of register 200. At the same time, the decimal carry $Cd$ is to be entered into carry flip-flop C.

Electrical gating circuits 201, 202, and 203 produce signals corresponding to digits $Rd^2$, $Rd^3$, and $Rd^4$, respectively, when $T=E=1$, and function as shifting gates at all other times, as signalled by $\overline{T}+\overline{E}=1$.

Each electrical gating circuit is mechanized in accordance with the Boolean algebraic function for the signal that it produces. Thus, electrical gating circuit 201 is mechanized in accordance with the Boolean algebraic function for $Rd^2$. With the introduction of the modified functions for E and $\overline{E}$, in the algebraic functions the resulting mechanized circuits representative of these functions will not only provide the desired binary-coded decimal digit but also the desired shifting operation.

For convenience, each of the Boolean algebraic functions utilized for mechanization is given the number of the corresponding electrical gating circuit. It will be noted, moreover, that the actual circuit signals $F^1$, $F^2$, etc. have been substituted into the functions. The mechanization functions for electrical gating circuits 201, 202 and 203 then are:

$$(201)\quad Rd=E\cdot\overline{F}^1+\overline{E}\cdot F^1$$
$$(202)\ \text{to}\ F1=E\cdot(\overline{F}^1\cdot\overline{F}^2+F^1\cdot F^2)+\overline{E}\cdot F^2$$
$$(203)\ \text{to}\ F2=E\cdot\overline{Rb}\cdot F^1+\overline{E}\cdot Rb$$

Symbol $Rd$ and the expressions to F1 and to F2 appearing to the left of the equations above signify, respectively, that electrical gating circuit 201 produces output signal series $Rd$, corresponding to the binary-coded decimal result, electrical gating circuit 202 produces signals which are applied to flip-flop F1, and electrical gating circuit 203 produces signals which are applied to flip-flop F2.

Electrical gating circuit 400 is mechanized to enter the true binary carry signals $Cb$ into flip-flop C, when $E=0$, and to produce and enter signal $Cd$ when $E=1$. The mechanization function for this is:

$$(400)\ \text{to}\ C=Cb+E$$

It will be noted that the input function for flip-flop F1 includes output signals $F^1$ and $\overline{F}^1$ produced by the same flip-flop. These signals are superfluous since, if flip-flop F1 already registers a 1, as indicated by $F^1=1$, it is not necessary to apply a signal to set the flip-flop to 1; similarly, if flip-flop F1 already registers a 0, as signalled by $\overline{F}^1=1$, it is not necessary to apply a signal to the flip-flop to set it to 0. Thus, the Boolean algebraic function for the 1 input circuit of flip-flop F1 can be simplified by substituting $F^1=0$ and $\overline{F}^1=1$ into the function 202 above. Similarly, the Boolean algebraic function for the 0 input circuit can be simplified by substituting $\overline{F}^1=0$ and $F^1=1$ into the complement of function 202 shown below. The input function for flip-flop F2 is simplified in a similar manner. Utilizing the simplification theory, then, the flip-flop input functions provided by electrical gating circuits 202 and 203 then are:

$$(202)\begin{cases}1F1=E.(\overline{F}^1.\overline{F}^2+F^1.F^2)+\overline{E}.F^2\\ \quad=E.\overline{F}^2+\overline{E}.F^2\\ 0F1=[\overline{E}+(F^1+F^2).(\overline{F}^1+\overline{F}^2)].(E+\overline{F}^2)\\ \quad=(\overline{E}+\overline{F}^2).(E+\overline{F}^2)\\ \quad=\overline{F}^2\end{cases}$$

$$(203)\begin{cases}1F2=\overline{E}.Rb+E.\overline{Rb}.F^1+E.\overline{Rb}.F^2\\ \quad=\overline{E}.Rb+E.\overline{Rb}.F^1\\ 0F2=E+\overline{Rb}).(\overline{E}+Rb+\overline{F}^1).(\overline{E}+Rb+\overline{F}^2)\\ \quad=(E+\overline{Rb}).(\overline{E}+Rb)\\ \quad=\overline{E}.\overline{Rb}+E.Rb\end{cases}$$

It will be noted that the "and" function $E\cdot\overline{Rb}\cdot F^2$, having a value of 0, has been introduced into the function 1F2. The addition of this term makes it possible to further simplify the 0F2 function, as above.

The simplified flip-flop input functions may be derived directly from the "truth" table above. For example, consider the input functions for flip-flop F1. Flip-flop F1 must be set to 1 whenever $\overline{E}=F^2=1$ or whenever $E=1$ and $F^2=F^1=1$ or $\overline{F}^2=\overline{F}^1=1$. This provides the 1F1 input function:

$$1F1=\overline{E}\cdot F^2+E\cdot(F^2\cdot F^1+\overline{F}^2\cdot\overline{F}^1)$$

which may be simplified, according to the simplification rules above, to:

$$1F1=\overline{E}\cdot F^2+E\cdot\overline{F}^2$$

which is the same as the expression for 1F1 in Equations 202 above.

Flip-flop F1 must be set to 0 whenever $\overline{E}=\overline{F}^2=1$ or $E=1$ and $\overline{F}^2=F^1=1$ or $F^2=\overline{F}^1=1$. This provides the 0 input function:

$$0F1=\overline{E}\cdot\overline{F}^2+E\cdot(\overline{F}^2\cdot F^1+F^2\cdot\overline{F}^1)$$

which may be reduced to:

$$0F1=\overline{F}^2$$

It will be noted from the simplified equations that a signal may be applied to the 1 input circuit of a flip-flop even though it is not to register a 1. For example, a signal is applied to 1F1 for sums of 11 or 12 even though flip-flop F1 to be set to 0. At the same time, however, a signal is applied to the 0 input circuit of flip-flop F1 so that the flip-flop is "triggered" from its original state which, reference to the table shows, was 1. Thus, the simultaneous application of signals to both input circuits of the flip-flop results in the complementing of the flip-flop output signals.

The Boolean algebraic functions for substraction may be derived either by subtracting signals E representing binary 6 in an analysis similar to that considered above, or they may be derived directly from a "truth" table. For simplicity, only the "truth" table derivations will be considered, reference being made to Table II below wherein all of the possible differences of two excess-0 numbers are listed. In Table II, it will be noted that E equals 1 whenever the difference is less than 0, and that E equals 0 whenever the difference is equal to or greater than 0.

TABLE II

| Difference | $\overline{E}$ | E | Cb | Rb | $F^2$ | $F^1$ | C | F2 | F1 | Rd |
|---|---|---|---|---|---|---|---|---|---|---|
| −(9, 0) | 0 | 1 | 1 | 0 | 1 | 1 | 1 | 0 | 0 | 0 |
| −(7, 8) | 0 | 1 | 1 | 1 | 0 | 0 | 1 | 0 | 0 | 1 |
| −(5, 6) | 0 | 1 | 1 | 1 | 0 | 1 | 1 | 0 | 1 | 0 |
| −(3, 4) | 0 | 1 | 1 | 1 | 1 | 0 | 1 | 0 | 1 | 1 |
| −(1, 2) | 0 | 1 | 1 | 1 | 1 | 1 | 1 | 1 | 0 | 0 |
| (0, 1) | 1 | 0 | 0 | 0 | 0 | 0 | 0 | 0 | 0 | 0 |
| (2, 3) | 1 | 0 | 0 | 0 | 0 | 1 | 0 | 0 | 0 | 1 |
| (4, 5) | 1 | 0 | 0 | 0 | 1 | 0 | 0 | 0 | 1 | 0 |
| (6, 7) | 1 | 0 | 0 | 0 | 1 | 1 | 0 | 0 | 1 | 1 |
| (8, 9) | 1 | 0 | 0 | 1 | 0 | 0 | 0 | 1 | 0 | 0 |

From the above table, it will be noted that $E=Cb$ and $\overline{E}=\overline{Cb}$. Consequently, it is possible to simplify the control signals for subtraction. However, where an adder-subtracter unit is desired, the addition control signals E and $\overline{E}$ may be utilized. In this case, the extra term $Rb\cdot(F^2+F^1)$ occurs only when $Cb=1$ and consequently introduces no error, although for subtraction it is redundant.

As in the circuitry for the addition correction, the subtraction control circuit includes the complementary timing signals T and $\overline{T}$ so that the true binary difference is corrected when $T=E=1$ and shifting is performed at all other times when $\overline{T}+\overline{E}=1$.

From the subtraction table, it can be seen that electrical gating circuit 201, producing output signal series $Rd$, is mechanized according to the Boolean algebraic signal function:

$$(201)\quad Rd=\overline{E}\cdot F^1+E\cdot\overline{F^1}$$

It will be noted that this is the same as the function for addition.

Flip-flop F1 is to be set to 1 for differences of −(5,6), −(3,4), (4,5) and (6,7). However, for differences of −(5,6) and (6,7) the flip-flop already registers 1 as indicated by signal $F^1=1$, and consequently no signal need be applied. Therefore, considering the remaining differences, the input function for input circuit 1F1 is found to be:

$$(202)\quad 1F1=\overline{E}.F^2.\overline{F^1}+E.F^2.\overline{F^1}$$
$$=F^2.\overline{F^1}$$

which, according to the rules for simplification, becomes:

$$1F1=F^2$$

Similarly, the input function for input circuit 0F1 is:

$$(202)\quad 0F1=\overline{E}\cdot\overline{F^2}\cdot F^1+E\cdot F^2\cdot F^1$$

which may be simplified to:

$$(202)\quad 0F1=\overline{E}\cdot\overline{F^2}+E\cdot F^2$$

In the same manner, the input functions for flip-flop F2 can be found from the table to be:

$$(203)\begin{cases}1F2=\overline{E}.Rb\\ 0F2=E.(\overline{Rb}+F^2.\overline{F^1})+\overline{E}.\overline{Rb}.F^2\\ \quad=\overline{Rb}+E.\overline{F^1}\end{cases}$$

As in addition, the binary-coded decimal carry $Cd=E$ and logical gate 400 is mechanized according to the function:

$$(400)\begin{cases}1C=Cb+E\\ 0C=\overline{Cb}.\overline{E}\end{cases}$$

The functions for addition and subtraction may be combined by introducing the operation sign signals S and $\overline{S}$. The convention assumed herein is that $S=1$ and $\overline{S}=0$ when the operation is $\pm A-B$ or $\pm A+(-B)$ and that $S=0$ and $\overline{S}=1$ when the operation is $\pm A+B$ or $\pm A-(-B)$. When $\overline{S}=1$, the operation may be considered as addition since the subtraction of a negative number is performed as an addition. Similarly, when $S=1$, the operation may be considered as subtraction since the addition of a negative number is performed as a subtraction.

With the introduction of signals S and $\overline{S}$, the combined adder-subtracter functions then are:

$$(201)\quad Rd=\overline{S}.(\overline{E}.F^1+E.\overline{F^1})+S.(\overline{E}.F^1+E.\overline{F^1})$$
$$=\overline{E}.F^1+E.\overline{F^1}$$

$$(202)\begin{cases}1F1=\overline{S}.(\overline{E}.F^2+E.\overline{F^2})+S.F^2\\ 0F1=\overline{S}.\overline{F^2}+S.(\overline{E}.\overline{F^2}+E.F^2)\end{cases}$$

$$(203)\begin{cases}1F2=\overline{S}.(\overline{E}.Rb+E.\overline{Rb}.F^1)+S.\overline{E}.Rb\\ 0F2=\overline{S}.(\overline{E}.\overline{Rb}+E.Rb)+S.(\overline{Rb}+E.\overline{F^1})\end{cases}$$

$$(400)\begin{cases}1C=\overline{S}.(Cb+E)+S.(Cb+E)\\ \quad=Cb+E\\ 0C=\overline{S}.\overline{Cb}.\overline{E}+S.\overline{Cb}.\overline{E}\\ \quad=\overline{Cb}.\overline{E}\end{cases}$$

It will be noted that the algebraic functions for the flip-flop input circuits considered above may be divided into two general classes. In one class of functions, hereinafter referred to as "general" functions, the conditions for setting a flip-flop to 1 are defined. The algebraic functions showing the relationship between the binary digits of the true binary results and the desired decimal digits, and those functions derivable therefrom by signal substitution, are general functions. In the other class of functions, hereinafter referred to as "setting" functions, the functions for the 1 and 0 input circuits are derived separately, and are simplified according to the rules described above.

In addition to the classes of functions above considered, there is a third class hereinafter referred to as "changing" or "triggering" functions. The changing or triggering function indicates when a flip-flop stable state must be changed from a 1 to a 0 or from a 0 to a 1. The changing functions, like the other two classes of functions, may be derived directly from a "truth" table by noting where the desired setting of a flip-flop differs from its previous setting.

Consider, for example, the changing function required for flip-flop F1 in Table I above. The flip-flop setting must be changed for sums of (2,3), (4,5), (10,11), (16,17), and (18,19). These sums are recognized in the algebraic expression:

$$1F1=0F1=\overline{E}\cdot(\overline{F^2}\cdot F^1+F^2\cdot\overline{F^1})+E\cdot\overline{F^2}$$
$$=\overline{F^2}\cdot F^1+\overline{E}\cdot F^2\cdot\overline{F^1}+E\cdot\overline{F^2}$$

where the notation $1F1=0F1$ is utilized to distinguish the changing functions from the general and setting functions above.

In a similar manner, it can be shown that the changing function for flip-flop F2 in Table I above is:

$$1F2=0F2=\overline{E}\cdot(F^2+Rb)+E\cdot(F^2+\overline{Rb}\cdot F^1)$$
$$=F^2+\overline{E}\cdot Rb+E\cdot\overline{Rb}\cdot F^1$$

And, referring to Table II, the changing functions for subtraction are found to be:

$$1F1=0F1=E\cdot F^2+\overline{E}\cdot(\overline{F^2}\cdot F^1+F^2\cdot\overline{F^1})$$
$$=E\cdot F^2+\overline{E}\cdot\overline{F^2}\cdot F^1+F^2\cdot\overline{F^1}$$
$$1F2=0F2=E\cdot(\overline{Rb}+F^2\cdot\overline{F^1})+\overline{E}\cdot(Rb+F^2)$$
$$=E\cdot\overline{Rb}+F^2\cdot\overline{F^1}+\overline{E}\cdot Rb+\overline{E}\cdot F^2$$

And the combined changing functions for addition and subtraction appear as:

$$1F1=0F1=\overline{S}.(\overline{F^2}.F^1+\overline{E}.F^2.\overline{F^1}+E.\overline{F^2})+S.(E.F^2+\overline{E}.\overline{F^2}.F^1+F^2.\overline{F^1})$$
$$=\overline{S}.\overline{F^2}.F^1+\overline{E}.F^2.\overline{F^1}+\overline{S}.E.\overline{F^2}+S.E.F^2+\overline{E}.\overline{F^2}.F^1+S.F^2.\overline{F^1}$$
$$1F2=0F2=\overline{S}.(F^2+\overline{E}.Rb+E.\overline{Rb}.F^1)+S.(E.\overline{Rb}+F^2.\overline{F^1}+\overline{E}.Rb+\overline{E}.F^2)$$
$$=\overline{S}.F^2+\overline{E}.Rb+E.\overline{Rb}.F^1+S.E.\overline{Rb}+S.F^2.\overline{F^1}$$

In mechanizing the above equations, each "and" function is provided by an "and" circuit, and each "or" function is provided by an "or" circuit. The leads which are connected to the input terminals of the "and" and "or" circuits are specified by the variables in the equations which, as explained above, may represent either signals or leads. Consider, for example, the mechanization of electrical gating circuit 201 illustrated in Fig. 2*b*. Electrical gating circuit 201 comprises a final "or" circuit 201–1 having a first input terminal connected to first "and" circuit 201–2 producing signal $\overline{E}.F^1$ and a second input terminal connected to second "and" circuit 201–3 producing signal $E.\overline{F^1}$. First "and" circuit 201–2 has two input terminals, one of which is connected to lead $\overline{E}$ and the other of which is connected to lead $F^1$. Second "and" circuit 201–3 has one input terminal connected to lead E and the other connected to lead $\overline{F^1}$.

In a similar manner, control circuit 300 shown in Fig. 2*a* is mechanized according to the functions:

$$E=T.Cb+T.Rb.F^2+T.Rb.F^1$$
$$\overline{E}=\overline{Cb}.\overline{Rb}+\overline{Cb}.\overline{F^2}.F^1+\overline{T}$$

Referring now to Fig. 2*a*, it will be noted that "or" circuit 301 produces signal E. "Or" circuit 301 has its input terminals connected to three "and" circuits 302, 304, and 306 producing signals $T.Cb$, $T.Rb.F^2$, and $T.Rb.F^1$, respectively. "Or" circuit 303, producing signal $\overline{E}$, has one input terminal connected to lead $\overline{T}$, the other input terminals being connected to "and" circuits 305 and 307 producing signals $\overline{Cb}.\overline{Rb}$ and $\overline{Cb}.\overline{F^2}.F^1$, respectively.

It will be noted that the control functions for E and $\overline{E}$ may be written in other factored forms. For example, the function for E may be written as:

$$(1)\quad E=T.[Cb+Rb.(F^2+F^1)]$$

or $$(2)\quad E=T.(Cb+Rb.F^2+Rb.F^1)$$

The mechanizations for these functions differ from those described above. In Example (1) above, a final "and" circuit produces signal E in response to signal T and $[Cb+Rb.(F^2+F^1)]$ applied to separate input terminals. Signal $[Cb+Rb.(F^2+F^1)]$ is produced by a first "or" circuit responsive to signals $Cb$ and $Rb.(F^2+F^1)$ applied to separate input terminals. Signal $Rb.(F^2+F^1)$ is produced by an "and" circuit responsive to signals $Rb$ and $(F^2+F^1)$ applied to separate input terminals. Finally, signal $(F^2+F^1)$ is produced by a second "or" circuit responsive to signals $F^2$ and $F^1$ applied to separate input terminals.

In Example 1 above, it will be noted that signals $F^1$ and $F^2$ appear as part of the output signal of each of the "and" and "or" circuits. This means that signals $F^1$ and $F^2$ must be effective through two "or" circuits and two "and" circuits before signal E is formed. The mechanization, then, for signal E in Example 1 above is referred to as requiring four levels since at least one of the signals therein must be effective through four logical circuits.

In a similar analysis, it can be seen that the mechanization of Example 2 above requires three levels, and that the mechanizations for E and $\overline{E}$ shown in Fig. 2*a* require only two levels.

As a general rule, mechanizations requiring a greater number of levels result in greater power dissipation although such mechanizations frequently make it possible to reduce the amount of circuitry required. It will be noted that the circuits illustrated in the figures are mechanized according to expanded functions, wherein no signal passes through more than two levels. These circuits are designed for reduced power requirement rather than circuit simplicity. It should be understood, however, that the present invention is not limited to circuits mechanized according to any particular form.

The mechanizations of electrical gating circuits 202, 203, and 400 shown in Figs. 2*b* and 2*c* include clock pulse circuits for converting the voltage-level signal representing a function to a pulse signal which is applied to the associated flip-flop. The clock pulse signal is introduced into the functions for the electrical gating circuits as a final "and" condition. A complete set of mechanization functions defining the structure shown in Figs. 2*a*, 2*b*, and 2*c* then is:

$$E=T.Cb+T.Rb.F^2+T.Rb.F^1$$
$$\overline{E}=\overline{Cb}.\overline{Rb}+\overline{Cb}.\overline{F^2}.F^1+\overline{T}$$

$$(201)\quad Rd=E.\overline{F^1}+\overline{E}.F^1$$

$$(202)\begin{cases}1F1=(\overline{E}.F^2+\overline{S}.E.\overline{F^2}+S.F^2).cp\\0F1=(\overline{S}.\overline{F^2}+\overline{E}.\overline{F^2}+S.E.F^2).cp\end{cases}$$

$$(203)\begin{cases}1F2=(\overline{E}.Rb+\overline{S}.E.\overline{Rb}.F^1).cp\\0F2=(\overline{E}.\overline{Rb}+\overline{S}.E.Rb+S.\overline{Rb}+S.E.\overline{F^1}).cp\end{cases}$$

$$(400)\begin{cases}1C=(Cb+E).cp\\0C=\overline{Cb}.\overline{E}.cp\end{cases}$$

The manner in which electrical gating circuits 202, 203, and 400 are mechanized from the corresponding equations above should be apparent from the examples already considered, and therefore it is not deemed necessary to consider Figs. 2*b* and 2*c* in further detail.

It will be noted that setting functions are utilized to provide the flip-flop input signals above. It should be understood, however, that general, changing, and setting functions may be utilized interchangeably, as desired.

Where the general function is utilized to provide input signals for a flip-flop, it is necessary to add a circuit which will apply signals to the 1 and 0 input circuits of the associated flip-flop when the corresponding input function equals 1 and 0, respectively. Such a circuit is described in copending application for patent entitled "Complementary Signal Generating Network" by Daniel L. Curtis, inventor, Serial No. 308,045, filed September 5, 1952 and assigned to the same assignee as the present invention. The illustrative mechanizations for changing functions are shown below when the excess-2 code is considered.

In considering the mechanizations for the other excess-N codes, it is important to note that the odd-excess codes, those where N is an odd integer, require a correction in the least significant binary digit of the true binary result. For example, in correcting a greater than 9, excess-3 sum, the binary equivalent of 3 (0011) is added necessitating that the least significant binary digit of the true binary result be complemented. When a correction is required in the least significant binary digit, a carry may be produced which must be sensed for the correction of the higher place binary digits. Consequently, an extra flip-flop is required for storing the least significant binary digit during the correction of the higher place binary digits. This means that in the odd-excess codes three flip-flops are required for embodiments of the present invention. In general, therefore, even-excess codes are preferable where a minimum of circuitry is desired. It should be noted, however, that the odd-excess codes may have certain desirable features. For example, the excess-3 code has the feature that no carry correction is ever required.

In the discussion which follows, the even-excess codes are considered first, and then odd-excess code correction is illustrated by considering the excess-3 code.

Of the even-excess codes, only the excess-2 code is considered in detail since the excess-6 correction is very similar to the excess-0 correction and the excess-4 correction is very similar to the excess-2 correction.

The similarity between the excess-0 and excess-6 codes may be observed from the excess-6 sum and difference Tables III and IV and the functions below. It will be noted that the excess-6 sum is not corrected when it is greater than 9 or when $E=1$, but is corrected by subtracting 6 (rather than by adding 6) when the sum is less than 9 or $\bar{E}=1$. It will also be noted that the functions for E and $\bar{E}$ are similar, respectively, to the functions for $\bar{E}$ and E in the excess-0 code except that certain variables are complemented, and that the functions for R*d*, F1 and F2 are similar to the complements of the corresponding excess-0 functions.

TABLE III

| Sum | $\bar{E}$ | E | C*b* | R*b* | $F^2$ | $F^1$ | C | F2 | F1 | R*d* |
|---|---|---|---|---|---|---|---|---|---|---|
| (0, 1) | 1 | 0 | 0 | 1 | 1 | 0 | 0 | 0 | 1 | 1 |
| (2, 3) | 1 | 0 | 0 | 1 | 1 | 1 | 0 | 1 | 0 | 0 |
| (4, 5) | 1 | 0 | 1 | 0 | 0 | 0 | 0 | 1 | 0 | 1 |
| (6, 7) | 1 | 0 | 1 | 0 | 0 | 1 | 0 | 1 | 1 | 0 |
| (8, 9) | 1 | 0 | 1 | 0 | 1 | 0 | 0 | 1 | 1 | 1 |
| (10, 11) | 0 | 1 | 1 | 0 | 1 | 1 | 1 | 0 | 1 | 1 |
| (12, 13) | 0 | 1 | 1 | 1 | 0 | 0 | 1 | 1 | 0 | 0 |
| (14, 15) | 0 | 1 | 1 | 1 | 0 | 1 | 1 | 1 | 0 | 1 |
| (16, 17) | 0 | 1 | 1 | 1 | 1 | 0 | 1 | 1 | 1 | 0 |
| (18, 19) | 0 | 1 | 1 | 1 | 1 | 1 | 1 | 1 | 1 | 1 |

$$E=Cb.(Rb+F^2.F^1)+\bar{T}$$
$$\bar{E}=T.[\overline{Cb}+\overline{Rb}.(\bar{F}^2+\bar{F}^1)]$$

*General functions*

$$Rd=E.F^1+\bar{E}.\bar{F}^1$$
$$\text{to } F1=E.F^2+\bar{E}.(F^2.\bar{F}^1+\bar{F}^2.F^1)$$
$$\text{to } F2=E.Rb+\bar{E}.(\overline{Rb}+F^1)$$
$$\text{to } C=Cb+E$$

*Setting functions*

$$1F1=\bar{E}.F^2.\bar{F}^1+E.F^2$$
$$=F^2$$
$$0F1=\bar{E}.F^2.F^1+E.\bar{F}^2.F^1$$
$$=\bar{E}.F^2+E.\bar{F}^2$$
$$1F2=\bar{E}.\overline{Rb}.\bar{F}^2+E.Rb.\bar{F}^2$$
$$=\bar{E}.\overline{Rb}+E.Rb$$
$$0F2=\bar{E}.Rb.\bar{F}^1+E.\overline{Rb}$$

*Changing functions*

$$\mathbf{1}F\mathbf{1}=\mathbf{0}F\mathbf{1}=F^2.(\bar{E}+\bar{F}^1)+E.\bar{F}^2.F^1$$
$$\mathbf{1}F\mathbf{2}=\mathbf{0}F\mathbf{2}=\bar{E}.(Rb.\bar{F}^1+\overline{Rb}.\bar{F}^2)=E.(\overline{Rb}+\bar{F}^2)$$
$$=\bar{E}.Rb.\bar{F}^1+\overline{Rb}.\bar{F}^2+E.\overline{Rb}+E.\bar{F}^2$$

TABLE IV

| Difference | $\bar{E}$ | E | C*b* | R*b* | $F^2$ | $F^1$ | C | F2 | F1 | R*d* |
|---|---|---|---|---|---|---|---|---|---|---|
| −(9, 0) | 0 | 1 | 1 | 0 | 1 | 1 | 1 | 0 | 1 | 1 |
| −(7, 8) | 0 | 1 | 1 | 1 | 0 | 0 | 1 | 1 | 0 | 0 |
| −(5, 6) | 0 | 1 | 1 | 1 | 0 | 1 | 1 | 1 | 0 | 1 |
| −(3, 4) | 0 | 1 | 1 | 1 | 1 | 0 | 1 | 1 | 1 | 0 |
| −(1, 2) | 0 | 1 | 1 | 1 | 1 | 1 | 1 | 1 | 1 | 1 |
| (0, 1) | 1 | 0 | 0 | 0 | 0 | 0 | 0 | 0 | 1 | 1 |
| (2, 3) | 1 | 0 | 0 | 0 | 0 | 1 | 0 | 1 | 0 | 0 |
| (4, 5) | 1 | 0 | 0 | 0 | 1 | 0 | 0 | 1 | 0 | 1 |
| (6, 7) | 1 | 0 | 0 | 0 | 1 | 1 | 0 | 1 | 1 | 0 |
| (8, 9) | 1 | 0 | 0 | 1 | 0 | 0 | 0 | 1 | 1 | 1 |

$$E=Cb,\ \bar{E}=\overline{Cb}$$

*General functions*

$$Rd=E.F^1+\bar{E}.\bar{F}^1$$
$$\text{to } F1=E.F^2+\bar{E}.(\bar{F}^2.\bar{F}^1+F^2.F^1)$$
$$\text{to } F2=E.Rb+\bar{E}.(Rb+F^2+F^1)$$
$$\text{to } C=Cb+E$$

*Setting functions*

$$1F1=E.F^2.\bar{F}^1+\bar{E}.\bar{F}^2.\bar{F}^1$$
$$=E.F^2+\bar{E}.\bar{F}^2$$
$$0F1=E.\bar{F}^2.F^1+\bar{E}.F^2.F^1$$
$$=\bar{F}^2$$
$$1F2=E.\bar{F}^2+\bar{E}.(\bar{F}^2.F^1+Rb)$$
$$=E+F^1+Rb$$
$$0F2=E.\overline{Rb}$$

*Changing functions*

$$\mathbf{1}F\mathbf{1}=\mathbf{0}F\mathbf{1}=E.(\bar{F}^2.F^1+F^2.\bar{F}^1)+\bar{E}.\bar{F}^2$$
$$=\bar{F}^2.F^1+E.F^2.\bar{F}^1+\bar{E}.\bar{F}^2$$
$$\mathbf{1}F\mathbf{2}=\mathbf{0}F\mathbf{2}=E.(\overline{Rb}+\bar{F}^2)+\bar{E}.(\bar{F}^2.F^1+Rb)$$
$$=E.\overline{Rb}+E.\bar{F}^2+\bar{F}^2.F^1+\bar{E}.Rb$$

In considering excess-2 Tables V and VI and the functions which follow, it is important to note several distinctions between the excess-0 and excess-2 functions. It will be observed that the excess-2 functions for E and $\bar{E}$ do not include complementary timing signals T and $\bar{T}$. This results because a correction is made whether E is 1 or 0 and thus $\bar{E}$ may signal that a correction is required as well as E. For example, in addition, a signal of $E=1$ indicates that it is necessary to add the binary equivalent of 4 (100) to the sum, and a signal of $\bar{E}=1$ indicates that it is necessary to subtract the binary equivalent of 2 (10). The signals T and $\bar{T}$ are introduced into the functions as final "and" conditions, where a correction is to be made and not to be made, respectively.

TABLE V

| Sum | $\bar{E}$ | E | C*b* | R*b* | $F^2$ | $F^1$ | C | $F^2$ | $F^1$ | R*d* |
|---|---|---|---|---|---|---|---|---|---|---|
| (0, 1) | 1 | 0 | 0 | 0 | 1 | 0 | 0 | 0 | 0 | 1 |
| (2, 3) | 1 | 0 | 0 | 0 | 1 | 1 | 0 | 0 | 1 | 0 |
| (4, 5) | 1 | 0 | 0 | 1 | 0 | 0 | 0 | 0 | 1 | 1 |
| (6, 7) | 1 | 0 | 0 | 1 | 0 | 1 | 0 | 1 | 0 | 0 |
| (8, 9) | 1 | 0 | 0 | 1 | 1 | 0 | 0 | 1 | 0 | 1 |
| (10, 11) | 0 | 1 | 0 | 1 | 1 | 1 | 1 | 0 | 0 | 1 |
| (12, 13) | 0 | 1 | 1 | 0 | 0 | 0 | 1 | 0 | 1 | 0 |
| (14, 15) | 0 | 1 | 1 | 0 | 0 | 1 | 1 | 0 | 1 | 1 |
| (16, 17) | 0 | 1 | 1 | 0 | 1 | 0 | 1 | 1 | 0 | 0 |
| (18, 19) | 0 | 1 | 1 | 0 | 1 | 1 | 1 | 1 | 0 | 1 |

$$E=Cb+Rb.F^2.F^1$$
$$\bar{E}=\overline{Cb}.(\overline{Rb}+\bar{F}^2+\bar{F}^1)$$

*General functions*

$$(201)\quad Rd=T.(\bar{E}.\bar{F}^1+E.F^1)+\bar{T}.F^1$$
$$\text{to } F\mathbf{1}=T.[\bar{E}.(\bar{F}^2.\bar{F}^1+F^2.F^1)+E.\bar{F}^2]+\bar{T}.F^2$$
$$\text{to } F\mathbf{2}=T.[\bar{E}.Rb.(F^2+F^1)+E.\overline{Rb}.F^2]+\bar{T}.Rb$$
$$(400)\quad \text{to } C=Cb+E$$

*Setting functions*

$$1F1=T.(\bar{E}.\bar{F}^2+E.F^2)+\bar{T}.F^2=T.\bar{F}^2+\bar{T}.F^2$$
$$0F1=T.(\bar{E}.\bar{F}^2+E.F^2)+\bar{T}.\bar{F}^2$$
$$1F2=T.\bar{E}.F^1+\bar{T}.Rb$$
$$0F2=T.(\bar{E}.\overline{Rb}+E.Rb)+\bar{T}.\overline{Rb}$$

*Changing functions*

$$(202)\quad 1F1=0F1=T.[\bar{F}^2.(\bar{E}+\bar{F}^1)+E.F^2.F^1]$$
$$(203)\quad 1F2=0F2=T.[\bar{E}.(\overline{Rb}+F^1)+E.Rb]$$

Only the correction changing functions, where $T=1$, are shown since setting functions are preferred for shifting when $T=0$ or $\bar{T}=1$.

$$(400)\quad 1C=0C=T.E.\overline{Cb}$$

TABLE VI

| Difference | Ē | E | Cb | Rb | F² | F¹ | C | F² | F¹ | Rd |
|---|---|---|---|---|---|---|---|---|---|---|
| −(9) | 0 | 1 | 1 | 0 | 1 | 1 | 1 | 0 | 0 | 1 |
| −(7, 8) | 0 | 1 | 1 | 1 | 0 | 0 | 1 | 0 | 1 | 0 |
| −(5, 6) | 0 | 1 | 1 | 1 | 0 | 1 | 1 | 0 | 1 | 1 |
| −(3, 4) | 0 | 1 | 1 | 1 | 1 | 0 | 1 | 1 | 0 | 0 |
| −(1, 2) | 0 | 1 | 1 | 1 | 1 | 1 | 1 | 1 | 0 | 1 |
| (0, 1) | 1 | 0 | 0 | 0 | 0 | 0 | 0 | 0 | 0 | 1 |
| (2, 3) | 1 | 0 | 0 | 0 | 0 | 1 | 0 | 0 | 1 | 0 |
| (4, 5) | 1 | 0 | 0 | 0 | 1 | 0 | 0 | 0 | 1 | 1 |
| (6, 7) | 1 | 0 | 0 | 0 | 1 | 1 | 0 | 1 | 0 | 0 |
| (8, 9) | 1 | 0 | 0 | 1 | 0 | 0 | 0 | 1 | 0 | 1 |

$$E=Cb,\ \bar{E}=\overline{Cb}$$

*General functions*

$$(201)\quad Rd=T.(E.F^1+\bar{E}.\bar{F}^1)+\bar{T}.F^1$$
$$\text{to } F1=T.[E.\bar{F}^2+\bar{E}.(F^2.F^1+\bar{F}^2.\bar{F}^1)]+\bar{T}.F^2$$
$$\text{to } F2=T.[E.Rb.F^2+\bar{E}.(Rb+F^2.F^1)]+\bar{T}.Rb$$
$$\text{to } C=Cb+E$$

*Setting functions*

$$1F1=T.(E.\bar{F}^2+\bar{E}.F^2)+\bar{T}.F^2$$
$$0F1=T.(E.F^2+\bar{E}.F^2)+\bar{T}.\bar{F}^2=T.F^2+\bar{T}.\bar{F}^2$$
$$1F2=T.\bar{E}.Rb+\bar{T}.Rb$$
$$0F2=T.(E.\overline{Rb}+\bar{E}.\bar{F}^1)+\bar{T}.\overline{Rb}$$

*Changing functions*

$$1F1=0F1=T.[F^2.(F^1+\bar{E})+E.\bar{F}^2.\bar{F}^1]$$
$$1F2=0F2=T.[E.Rb+\bar{E}.(Rb+F^2.\bar{F}^1)]$$

In the mechanization of the excess-2 correction illustrated in Figs. 3*a*, 3*b*, and 3*c*; the pairs of Equations 201, 202, 203, and 400 above are combined by introducing the variables S and S̄ as explained above. It will be noted that the changing functions are mechanized although, as has been explained, the general, setting and changing functions may be used interchangeably. The equations are left in a factored form so that Figs. 3*a*, 3*b*, and 3*c* illustrate a factored mechanization. The combined adder-subtracter equations utilized in the mechanizations shown in Figs. 3*a*, 3*b*, and 3*c* then are:

$$E=Cb+Rb.F^2.F^1$$
$$\bar{E}=\overline{Cb}.(\overline{Rb}+\bar{F}^2+\bar{F}^1)$$
$$(201)\quad Rd=T.(\bar{E}.\bar{F}^1+E.F^1)+\bar{T}.F^1$$
$$(202)\quad 1F1=0F1=\{\bar{S}.T.[\bar{F}^2.(\bar{E}+\bar{F}^1)+E.F^2.F^1]+S.T.[F^2.(F^1+\bar{E})+E.\bar{F}^2.\bar{F}^1]\}.cp$$
$$=T.[F^2.F^1.(S+E)+\bar{F}^2.\bar{F}^1.(E+\bar{S})+\bar{E}.(\bar{S}.\bar{F}^2+S.F^2)].cp$$
$$(203)\quad 1F2=0F2=T.\{\bar{S}.[\bar{E}.(\overline{Rb}+F^1)+E.Rb]+S.[E.\overline{Rb}+\bar{E}.(Rb+F^2.\bar{F}^1)]\}.cp$$

The manner in which the circuits shown in Figs. 3*a*, 3*b*, and 3*c* are mechanized according to Equations 201, 202, 203, and 400 should be apparent from the examples already given, and therefore will not be discussed in detail.

As has been explained, an extra flip-flop is required for the excess-3 correction, and thus, in Table VII below, it will be noted that three flip-flop signals $F^1$, $F^2$, and $F^3$, produced by corresponding flip-flops F1, F2, and F3, are utilized to designate corresponding colums. For simplicity, only setting functions are shown although it should be understood that the other types of functions shown above may be utilized as well. It is not necessary to consider the subtraction correction since, for the excess-3 code, it is simpler to form the 10's complement of negative numbers and then add. It will be noted that the signals E and Ē are equal to $Cb$ and $\overline{Cb}$, respectively. Thus, an extra level is not required in generating the control functions since $Cb$ and $\overline{Cb}$ are substituted directly into the equations.

TABLE VII

| Sum | Ē | E | Cb | Rb | F³ | F² | F¹ | C | F3 | F2 | F1 | Rd |
|---|---|---|---|---|---|---|---|---|---|---|---|---|
| 0 | 1 | 0 | 0 | 0 | 1 | 1 | 0 | 0 | 0 | 0 | 1 | 1 |
| 1 | 1 | 0 | 0 | 0 | 1 | 1 | 1 | 0 | 0 | 1 | 0 | 0 |
| 2 | 1 | 0 | 0 | 1 | 0 | 0 | 0 | 0 | 0 | 1 | 0 | 1 |
| 3 | 1 | 0 | 0 | 1 | 0 | 0 | 1 | 0 | 0 | 1 | 1 | 0 |
| 4 | 1 | 0 | 0 | 1 | 0 | 1 | 0 | 0 | 0 | 1 | 1 | 1 |
| 5 | 1 | 0 | 0 | 1 | 0 | 1 | 1 | 0 | 1 | 0 | 0 | 0 |
| 6 | 1 | 0 | 0 | 1 | 1 | 0 | 0 | 0 | 1 | 0 | 0 | 1 |
| 7 | 1 | 0 | 0 | 1 | 1 | 0 | 1 | 0 | 1 | 0 | 1 | 0 |
| 8 | 1 | 0 | 0 | 1 | 1 | 1 | 0 | 0 | 1 | 0 | 1 | 1 |
| 9 | 1 | 0 | 0 | 1 | 1 | 1 | 1 | 0 | 1 | 1 | 0 | 0 |
| 10 | 0 | 1 | 1 | 0 | 0 | 0 | 0 | 1 | 0 | 0 | 1 | 1 |
| 11 | 0 | 1 | 1 | 0 | 0 | 0 | 1 | 1 | 0 | 1 | 0 | 0 |
| 12 | 0 | 1 | 1 | 0 | 0 | 1 | 0 | 1 | 0 | 1 | 0 | 1 |
| 13 | 0 | 1 | 1 | 0 | 0 | 1 | 1 | 1 | 0 | 1 | 1 | 0 |
| 14 | 0 | 1 | 1 | 0 | 1 | 0 | 0 | 1 | 0 | 1 | 1 | 1 |
| 15 | 0 | 1 | 1 | 0 | 1 | 0 | 1 | 1 | 1 | 0 | 0 | 0 |
| 16 | 0 | 1 | 1 | 0 | 1 | 1 | 0 | 1 | 1 | 0 | 0 | 1 |
| 17 | 0 | 1 | 1 | 0 | 1 | 1 | 1 | 1 | 1 | 0 | 1 | 0 |
| 18 | 0 | 1 | 1 | 1 | 0 | 0 | 0 | 1 | 1 | 0 | 1 | 1 |
| 19 | 0 | 1 | 1 | 1 | 0 | 0 | 1 | 1 | 1 | 1 | 0 | 0 |

$$E=Cb,\ \bar{E}=\overline{Cb}$$
$$Rd=T.\bar{F}^1+\bar{T}.F^1$$
$$1F1=(\bar{E}.F^2+E.\bar{F}^2).T+\bar{T}.F^2=(\overline{Cb}+\bar{T}).F^2+Cb.T.\bar{F}^2$$
$$0F1=(\bar{E}.F^2+E.\bar{F}^2).T+\bar{T}.\bar{F}^2=(Cb+\bar{T}).\bar{F}^2+\overline{Cb}.T.F^2$$
$$1F2=[\overline{Cb}.\bar{F}^3+Cb.(F^1.\bar{F}^3+\bar{F}^1.F^3)].T+\bar{T}.F^3$$
$$0F2=[\overline{Cb}.(F^1.\bar{F}^3+\bar{F}^1.F^3)+Cb.F^3].T+\bar{T}.\bar{F}^3$$
$$1F3=(\overline{Cb}.F^2.F^1+Cb.Rb).T+\bar{T}.Rb$$
$$0F3=(\overline{Cb}.\overline{Rb}+Cb.\bar{F}^2.\bar{F}^1).T+\bar{T}.\overline{Rb}$$

It is possible to further reduce the total number of levels required for any excess-N mechanization by substituting the functions for E and Ē into the corresponding Equations 201, 202, 203, and 400 and then expanding and simplifying. This is extremely simple for the subtraction equations since, in this case, $Cb$ is substituted for E and $\overline{Cb}$ for Ē. However, for the addition equations or the addition-subtraction equations, it is somewhat more difficult to manipulate the equations algebraically than it is to derive completely expanded functions directly from a "truth" table. In deriving a completely expanded function from the "truth" table, the E and Ē columns are not considered and all functions are made dependent upon the remaining variables. As an example of a function wherein E and Ē have been eliminated and the function has been expanded so that it necessitates only two levels, consider the function for electrical gating circuit 201 for the excess-0 code. This is:

$$(201)\quad Rd=\bar{S}.\overline{Rb}.F^1+\bar{S}.T.Rb.F^2.\bar{F}^1+\bar{S}.Cb.F^1+S.T.Cb.\bar{F}^1+S.T.\overline{Cb}.F^1+\bar{T}.F^1$$

Each of the algebraic equations discussed above may be modified by adding functions which are equal to 0, such as $F^1.\bar{F}^1$, or functions which do not exist in the code; by multiplying the equation or part thereof by functions equal to 1, such as $Rb+\overline{Rb}$; or by substituting equivalent variables or functions as indicated by the "truth" table, or algebraic analysis. Since each algebraic function may be modified to any one of a considerable number of functions in this manner, it is necessary to consider each function as generic to all other functions which may be derived therefrom. Thus, the present invention is not limited to embodiments defined by the functions specifically described herein, but is generic to a class of embodiments defined by the functions given and their derivatives.

Having considered the algebraic functions which provide a general definition of embodiments of the present invention, let use now consider specific circuit elements suitable for use as "plug-in" units.

A flip-flop which is suitable for use in embodiments of the present invention is shown in Fig. 4. The 1 and 0 input circuits of the flip-flop are coupled, respectively, to the control grid of a first electron discharge tube 407 and the control grid of a second electron discharge tube 408.

The 1 and 0 input circuits of the flip-flop include capacitors 401 and 402, load resistors 403 and 404, and diodes 405 and 406, respectively. Diodes 405 and 406 are coupled to the control grids of tubes 407 and 408, respectively, and are biased such that only negative signals may pass to the control grids. The complementary output signals of the flip-flop, F and $\overline{F}$, are derived, respectively, from first and second resistor networks 409 and 410. The signal F is derived from point 411 in first resistor network 409, and signal $\overline{F}$ is derived from point 412 in second resistor network 410. The anodes of tubes 407 and 408 are connected, respectively, to first and second resistor networks 409 and 410, and a B+ potential is applied to the junction 414 connecting the networks.

When a negative signal is applied to the 1 input circuit of the flip-flop, and tube 407 is conducting, a negative signal passes to the grid of tube 407 through diode 405 and tube 407 becomes nonconducting. Due to the well-known action of the cross coupling circuits of the flip-flop, tube 408 then becomes conducting. As a result, the anode voltage of tube 407 rises toward B+ whereas the anode voltage of tube 408 becomes more negative. Output signals F and $\overline{F}$, then, are clamped, respectively, at 140 and 125 volts by diode clamping network 413. The voltages of 140 and 125 volts are assumed to represent the binary values of 1 and 0, respectively.

When a negative signal is applied to the 0 input circuit of the flip-flop, and tube 408 is conducting, tube 408 becomes nonconducting and tube 407 becomes conducting. In this situation, the ouput signals are complemented with respect to the above values, signals F and $\overline{F}$ being clamped at 125 and 140 volts, respectively, by the diode clamping network 413.

When negative signals are applied simultaneously to both input circuits, the flip-flop changes from one stable state to another and the output signals are complemented.

Diode "and" and "or" circuits are illustrated in Figs. *5a* and *5b*, respectively. In the "and" circuit, a positive potential, such as 265 volts, is applied to the anodes of three diodes 516, 517, and 518 through a gate resistor 515. Input signals, having either one or two voltage levels representing binary 1 or 0, are applied to input terminals 519, 520, and 521 which are connected, respectively, to the cathodes of diodes 516, 517, and 518. It is assumed that 140 and 125 volts are utilized, respectively, to represent binary 1 and 0.

When the signals applied to all of the input terminals are at 140 volts or the "1" level, the output signal of the "and" circuit is approximately 140 volts. Thus, the application of a 1 representing signal level at each of the signal terminals produces a 1 output signal. However, if any of the input signals is at the 125 volt level representing 0, then the output signal of the "and" circuit falls to approximately 125 volts indicating that the "and" condition of the circuit is not satisfied.

In the "or" circuit of Fig. *5b*, the cathode of each of diodes 523, 524, and 525 is coupled through a gate resistor 522 to ground. The input terminals 526, 527, and 528 of the "or" circuit are connected to diodes 523, 524, and 525, respectively. Assuming again that 140 and 125 volts represent, respectively, 1 and 0, it will be noted that if 140 volts is applied to any of the input terminals of the "or" circuit, the output signal becomes 140 volts or 1. Thus, the "or" circuit produces an output 1 signal when a 1 signal is applied to any one of its input terminals.

If the "and" circuit shown in Fig. *5a* is the final "and" circuit of a logical network and has its output terminal coupled to the input circuit of a flip-flop, then a clock pulse signal is applied to one of its input terminals, for example, input terminal 519. The clock pulse is assumed to be a negative-going signal which is initially at 140 volts and decreases to 125 volts. If the signal applied to input terminal 520 is 125 volts representing 0, then the application of a clock pulse signal to terminal 519 will have no effect since there will be no change in the level of the output signal. However, if prior to the application of a clock pulse, the final "and" circuit signal level is 140 volts, then, when the clock pulse is applied, the output signal level will change rapidly from 140 volts to 125 volts and a negative signal will be applied to the flip-flop input circuit to which the output circuit of the final "and" circuit is connected.

When the final logical circuit is an "or" circuit, special circuitry must be provided in order to introduce the clock pulse. In this case, the final "or" circuit provides both "and" and "or" logic. If signals *a* and *b* are applied to two input terminals of the final "or" circuit and the clock pulse is applied to a third input terminal of the final "or" circuit, then the logic appears as $cp.(a+b)$. Since this expression involves both "and" and "or" logic, it has been represented in Figs. *2a*, *2b*, and *2c* as an "and" circuit having a clock pulse signal and signal $(a+b)$ applied to separate input terminals, and an "or" circuit for producing signal $(a+b)$ having signals *a* and *b* applied to separate input terminals.

In practical applications, it is possible to combine the "and" and "or" logic into one circuit. Where all of the input signals for the final "or" circuit are produced by lower level "and" circuits, the combined clock pulse and final "or" circuit is as shown in Fig. *5c*. It will be noted that diodes 531 and 532 and gate resistor 529 in Fig. *5c* are connected in the same manner as the "or" circuit of Fig. *5b*. Diode 530, however, is reversed, and the negative-going clock pulse is applied to its cathode. The circuit shown in Fig. *5c* produces a negative-going signal which is applied to the input terminal of a flip-flop when a 1 or a 140 volt signal is applied to one or more of the other input terminals.

It is apparent from the foregoing description that the present invention provides a serial arithmetic unit wherein the true binary result of an operation is corrected to produce the desired binary-coded decimal result without any additional delay; and that embodiments of the present invention need only a minimum of flip-flops for storing the digits of the true binary result during correction, two being required for the excess-even codes and three for the excess-odd codes.

It has been pointed out that the principles of the present invention are applicable to all excess-N codes although certain codes have features which are preferred.

While only two embodiments have been illustrated in detail, it has been established that for each embodiment shown, a great number of variations are possible. General changing and setting functions may be used interchangeably, as desired. The functions may be mechanized in expanded or various factored forms. New equations may be derived from those given by the addition of functions equal to 0, multiplication by functions equal to 1, and by the substitution of equivalent functions which may be derived algebracially or from a "truth" table.

Specific diode circuits have been shown for providing the logical "and," "or," and clock pulse operations. It should be understood, however, that these may be replaced by other logical circuits providing the same operation.

What is claimed as new is:

1. A computer element comprising an electrical arithmetic element for combining decimal coded binary signals represented in a predetermined code to produce electrical signals representative of the true binary result of an arithmetic operation thereon, a shifting register connected to said arithmetic element to receive and store said true binary signals, said register including a plurality of bistable elements having at least two input and two output leads and a corresponding plurality of "logical" gating circuits individual to each of said input and output leads "logically" arranged in accordance with said predetermined code for directing the path of said true binary signals through said shifting register in response to advancing signals, a "logical" control circuit connected in circuit relationship with said arithmetic element and said shifting register to receive said true binary signals from said element and the output signals representative of the storage condition of said bistable elements to provide an output signal in response to the "logical" combination of said electrical signals, the output signal from said control circuit being delivered to each of said gating elements, means for generating a correction sensing signal during predetermined time intervals, circuit means for applying said correction sensing signal in combination with the output signal of said control circuit to change the binary value of said true binary signals passing through each of said gating elements upon the occurrence of a "logical" correction condition in each of said elements, means for storing a carry signal produced by said arithmetic element or said correction signals, and means for advancing said electrical signals through said arithmetic element and said shifting register in a timed relationship whereby the binary coded electrical signals emerging from said register represent the correct decimal coded binary result of said first and second binary electrical signals.

2. In a serial arithmetic unit for performing an operation of addition or subtraction upon a pair of decimal numbers represented according to a predetermined binary code by producing a first signal series including first, second, third, and fourth binary electrical signals respectively corresponding to the first, second, third, and fourth binary digits of the true binary result of addition or subtraction of a pair of decimal digits, one from each of said numbers, and then correcting said first signal series to produce a second signal series corresponding to the result of said operation represented according to said predetermined binary code, the combination comprising: shifting and correcting register means including first and second bistable devices, a first electrical gating circuit connected to said first bistable device and providing an output circuit for said register means, a second electrical gating circuit interconnecting said bistable devices, and a third electrical gating circuit connected to said first bistable device and providing an input circuit for said register means; and control means including first means operable to actuate said electrical gating circuits to shift said first signal series through said register means until said second and third signals are simultaneously stored in said first and second bistable devices, respectively, second means operable at the completion of the operation of said first means to actuate said electrical gating circuits to produce said second signal series and simultaneously shift said second signal series through said register means, and means for applying each of said signal series to said third electrical gating circuit and said control means in a predetermined time relationship.

3. The combination defined in claim 2 wherein said predetermined binary code is an excess-N code, where N is one of the integers 0 through 6; wherein the true binary sum produced during the operation of addition of a pair of decimal digits is corrected to a sum in said excess-N code by subtracting the binary equivalent of N when the sum is equal to or less than 9 and by adding the binary equivalent of $(6-N)$ when the sum is greater than 9; and wherein the true binary difference produced in an operation of subtraction of a pair of decimal digits is corrected to said predetermined binary code by adding the binary equivalent of N if the difference is equal to or greater than 0 or by subtracting the binary equivalent of $(6-N)$ if the difference is less than 0.

4. A serial arithmetic unit for performing operations of addition and subtraction in response to binary complementary operation sign signals $\overline{S}$ and S, respectively, upon binary coded decimal digits in the excess-0 code, said unit comprising: adder-subtracter means for producing complementary binary electrical signal series R$b$, $\overline{Rb}$ corresponding to the true binary result of an operation upon said decimal digits, said adder-subtracter means including means for producing binary carry signals C$b$ and $\overline{Cb}$; shifting and correcting register means responsive to signal series R$b$ for producing a signal series R$d$ corresponding to the result of said operation in said excess-0 code, said register means including first and second flip-flops producing complementary output signals $F^1$, $\overline{F}^1$ and $F^2$, $\overline{F}^2$, respectively, a first electrical gating circuit responsive to signals $F^1$ and $\overline{F}^1$ for producing signal series R$d$, a second electrical gating circuit responsive to signals $F^2$, $\overline{F}^2$ for interconnecting said flip-flops, and a third electrical gating circuit connected to said first flip-flop and responsive to said signal series R$b$, $\overline{Rb}$ for providing an input circuit for said register means; and control means responsive to said signals R$b$, $\overline{Rb}$; C$b$, $\overline{Cb}$; $F^1$, $\overline{F}^1$; and $F^2$, $\overline{F}^2$ for producing complementary control signals E and $\overline{E}$, said electrical gating circuits being responsive to said signals E and $\overline{E}$ to shift signal series R$b$ into said register means and for then producing signal series R$d$ and simultaneously shifting signal series R$d$ out of said register means.

5. A serial arithmetic unit for adding a pair of decimal digits each represented by a series of four binary digits in an excess-N code, where N is one of the integers 0 through 6, said unit comprising: an adder for producing complementary binary electrical signal series R$b$ and $\overline{Rb}$ corresponding to the true binary sum of said decimal digits and complementary binary electrical signal series C$b$ and $\overline{Cb}$ corresponding to the binary carry digits produced in adding associated pairs of binary digits respectively representing said decimal digits; register means including first and second flip-flops having input circuits 1F1, 0F1 and 1F2, 0F2 and producing signals $F^1$, $\overline{F}^1$ and $F^2$, $\overline{F}^2$, respectively, a first electrical gating circuit responsive to signals $F^1$ and $\overline{F}^1$ for producing signal series R$d$ corresponding to the sum of said digits in the excess-N code, a second electrical gating circuit responsive to signals $F^2$ and $\overline{F}^2$ and coupled to input circuits 1F1 and 0F1, and a third electrical gating circuit connected to input circuits 1F2 and 0F2 and providing an input circuit for said register means; and control means for producing complementary control signals E and $\overline{E}$ to actuate said electrical gating circuits to shift said signal series R$b$ into said register means and to further actuate said electrical gating circuits to produce and shift said signal series R$d$ out of said register means; said complementary signals E and $\bar{E}$ having levels representing binary 1 and 0, respectively, when the sum of said digits is greater than 9 and having levels representing binary 0 and 1, respectively, when the sum of said decimal digits is equal to or less than 9.

6. In a serial arithmetic unit for performing an operation of addition or subtraction upon numbers represented in a binary-coded decimal form, by producing a first signal series including first, second, third, and fourth signals corresponding to the first, second, third, and fourth binary digits, respectively, of the true binary result of said operation, and then correcting said first signal series to produce a second signal series corresponding to the result of said operation represented in said binary-coded decimal form: a shifting and correcting register including first and second bistable devices, a first electrical gating circuit connected to said first bistable device and providing an output circuit for said register, a second electrical gating circuit interconnecting said bistable devices, a third electrical gating circuit connected to said second bistable device and providing an input circuit for said register; means for applying a complementary pair of control signals to said electrical gating circuits to actuate said gating circuits to shift said first signal series through said register until said second and third signals are simultaneously stored in said first and second bistable devices, respectively; and means for applying a control signal to said electrical gating circuits to actuate said electrical gating circuits to produce said second signal series and simultaneosuly to shift said second signal series through said register, and means for applying said first signal series to said third electrical gating circuit and to each of said latter mentioned means to produce said control signals.

7. In a serial arithmetic unit for performing an arithmetic operation upon decimal digits in an excess-N code by producing a first binary electrical signal series corresponding to the true binary result of said operation, and then correcting said first signal series to produce a second binary electrical signal series corresponding to the result of said operation in said excess-N code: a shifting and correcting register including first and second flip-flops respectively producing first and second binary signal pairs, a first electrical gating circuit responsive to said first signal pair for producing said second signal series, a second electrical gating circuit interconnecting said flip-flops, a third electrical gating circuit connected to said second flip-flop and providing an input circuit for said register, and means for applying control signals to said electrical gating circuits for actuating said electrical gating circuits to shift in and correct said first signal series to produce said second signal series, said latter mentioned means including means responsive to said first signal series for generating said control signals.

8. A digital computer element comprising an electrical arithmetic element for combining first and second electrical signals representative of binary digits in a predetermined code to produce electrical signals representative of the true binary result of an arithmetic operation performed therein, a shifting register connected to said arithmetic element to receive and store said true binary signals, said register including at least a pair of bistable elements and a plurality of gating elements comprised of "and" and "or" circuits, said "and" and "or" circuits being connected in circuit relationship with said bistable elements and said arithmetic element in accordance with said predetermined code for directing the path of said true binary signals into and out of said shifting register through said bistable elements, a radix correction control circuit connected in circuit relationship with said arithmetic element and said shifting register to receive said true binary signals from said element and the output signals from said bistable elements, said control circuit comprising a plurality of "and" and "or" circuits arranged in accordance with said predetermined code to provide an output signal in response to said electrical signals received therein, means for connecting said output signal from said control circuit to each of said gating elements in accordance with said predetermined code, means for generating a correction sensing signal during predetermined binary time intervals, circuit means for applying said correction sensing signal in combination with the output signal of said correction control circuit to each of said gating elements to change the direction of travel of said true binary signals through same upon the occurrence of a "logical" correction condition in each of said "and" and "or" circuits, means for storing a carry signal produced by said arithmetic element and said correction signals, and means for advancing said electrical signals including said carry signal through said arithmetic element and said shifting register in a timed relationship whereby the binary coded electrical signals emerging from said register represent the correct decimal coded binary arithmetic result of said first and second electrical signals.

References Cited in the file of this patent

UNITED STATES PATENTS

| | | |
|---|---|---|
| 2,538,615 | Carbrey | Jan. 16, 1951 |
| 2,570,716 | Rochester | Oct. 9, 1951 |
| 2,589,465 | Weiner | Mar. 18, 1952 |
| 2,656,106 | Stabler | Oct. 20, 1953 |
| 2,686,299 | Eckert | Aug. 10, 1954 |
| 2,703,202 | Cartwright | Mar. 1, 1955 |
| 2,715,678 | Barney | Aug. 16, 1955 |
| 2,719,228 | Auerbach et al. | Sept. 27, 1955 |
| 2,723,080 | Curtis | Nov. 8, 1955 |

FOREIGN PATENTS

| | | |
|---|---|---|
| 678,427 | Great Britain | Sept. 3, 1952 |

OTHER REFERENCES

Booth: An Electronic Digital Computer, Electronic Engineering, December 1950; pages 492 to 498.